US011689258B2

(12) United States Patent
Namgoong et al.

(10) Patent No.: US 11,689,258 B2
(45) Date of Patent: Jun. 27, 2023

(54) CHANNEL ESTIMATION AND DEMODULATION PROCEDURE FOR NON-LINEAR MULTI-USER MULTIPLE-INPUT MULTIPLE-OUTPUT PRECODING

(71) Applicant: QUALCOMM Incorporated, San Diego, CA (US)

(72) Inventors: June Namgoong, San Diego, CA (US); Hyojin Lee, San Diego, CA (US); Taesang Yoo, San Diego, CA (US); Naga Bhushan, San Diego, CA (US); Tingfang Ji, San Diego, CA (US); Krishna Kiran Mukkavilli, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 17/537,332

(22) Filed: Nov. 29, 2021

(65) Prior Publication Data
US 2023/0170949 A1      Jun. 1, 2023

(51) Int. Cl.
*H04B 7/02* (2018.01)
*H04B 7/0456* (2017.01)
(Continued)

(52) U.S. Cl.
CPC ......... *H04B 7/0456* (2013.01); *H04B 7/0634* (2013.01); *H04L 25/0204* (2013.01); *H04L 25/0224* (2013.01); *H04W 72/23* (2023.01)

(58) Field of Classification Search
CPC . H04B 7/0456; H04B 7/0634; H04L 25/0204; H04L 25/0224; H04W 72/042
(Continued)

(56) References Cited

U.S. PATENT DOCUMENTS 10,355,763 B2 *  7/2019  Kim .................... H04B 7/0478
11,616,541 B1    3/2023  Namgoong
(Continued)

FOREIGN PATENT DOCUMENTS

CN    WO 2014033515    *  3/2014
JP       2016533098    * 10/2016

OTHER PUBLICATIONS

International Search Report and Written Opinion—PCT/US2022/050894—ISA/EPO—dated Mar. 6, 2023.
(Continued)

*Primary Examiner* — Helene E Tayong
(74) *Attorney, Agent, or Firm* — Holland & Hart LLP

(57) ABSTRACT

Methods, systems, and devices for wireless communications are described. A base station may associate a first and second port with a set of antenna elements based on a first and second linear precoding vector. The base station may generate coefficients indicating a first combination and a second combination of a first data set for a first user equipment (UE) and a second data set for a second UE. The base station may apply the first and second linear precoding vectors to the first and second combinations, respectively, transmit a first demodulation reference signal (DMRS) and a second DMRS using a first comb corresponding to the first and second ports, and transmit at least a third DMRS indicating the coefficients using a second comb. The UEs may extract data from the precoded combinations by applying the coefficients and estimating channels associated with the first and second DMRS.

30 Claims, 20 Drawing Sheets

(51) Int. Cl.
*H04L 25/02* (2006.01)
*H04B 7/06* (2006.01)
*H04W 72/23* (2023.01)

(58) Field of Classification Search
USPC .......................................................... 375/267
See application file for complete search history.

(56) References Cited

U.S. PATENT DOCUMENTS

| | | |
|---|---|---|
| 2008/0225960 A1 | 9/2008 | Kotecha et al. |
| 2010/0254473 A1* | 10/2010 | Wu .................. H04L 25/03343 |
| | | 375/267 |
| 2016/0294454 A1 | 10/2016 | Onggosanusi et al. |
| 2020/0106491 A1 | 4/2020 | Wu et al. |
| 2021/0194559 A1 | 6/2021 | Li et al. |

OTHER PUBLICATIONS

Masouros C., et al., "Dynamic Linear Precoding for the Exploitation of Known Interference in Mimo Broadcast Systems", IEEE Transactions on Wireless Communications, IEEE Service Center, Piscataway, NJ, US, vol. 8, No. 3, Mar. 1, 2009, pp. 1396-1404, XP011253443, ISSN: 1536-1276, Abstract, Sections III and IV, p. 1396-1399, Figures 1,2.

* cited by examiner

CHANNEL ESTIMATION AND DEMODULATION PROCEDURE FOR NON-LINEAR MULTI-USER MULTIPLE-INPUT MULTIPLE-OUTPUT PRECODING

FIELD OF TECHNOLOGY

The following relates to wireless communications, including channel estimation and demodulation procedures for non-linear multi-user multiple-input multiple-output precoding.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support channel estimation and demodulation procedures for non-linear multi-user multiple-input multiple-output precoding. Generally, the described techniques provide for a base station to indicate combination coefficients to two user equipments (UEs) such that the two UEs may utilize the combination coefficients to extract shared channel data for the respective UEs. A base station may use a first port and a second port to transmit precoded first and second linear combinations of a first and second data set associated with the first UE and the second UE, respectively. In some examples, the base station may transmit a first demodulation reference signal (DMRS) associated with the first port and a second DMRS associated with the second port via a first comb and transmit an indication of the combination coefficients via a second comb (e.g., via a third DMRS associated with a third port and/or a fourth DMRS associated with a fourth port). The UEs may extract data from the precoded linear combinations by applying the combination coefficients and estimating channels associated with the first DMRS and the second DMRS.

A method is described. The method may include associating a first port with a set of multiple antenna elements of an antenna array, the first port based on a first linear precoding vector and having a first phase, associating a second port with the set of multiple antenna elements of the antenna array, the second port based on a second linear precoding vector and a phase shift such that the second port has a second phase that is coherent with the first phase, transmitting, to a first UE and a second UE, control signaling indicating that the first linear precoding vector is applied to a first combination of data sets and that the second linear precoding vector is applied to a second combination of data sets, where the first combination is of a first data set for the first UE and a second data set for the second UE, and the second combination is also of the first data set for the first UE and the second data set for the second UE but is different from the first combination, transmitting a first demodulation reference signal associated with the first port, transmitting a second demodulation reference signal associated with the second port, and a transmitting a third demodulation reference signal associated with a third port at the base station, where the third demodulation reference signal includes information for extracting the first data set for the first UE and the second data set for the second UE.

An apparatus is described. The apparatus may include a processor, memory coupled with the processor, and instructions stored in the memory. The instructions may be executable by the processor to cause the apparatus to associate a first port with a set of multiple antenna elements of an antenna array, the first port based on a first linear precoding vector and having a first phase, associate a second port with the set of multiple antenna elements of the antenna array, the second port based on a second linear precoding vector and a phase shift such that the second port has a second phase that is coherent with the first phase, transmit, to a first UE and a second UE, control signaling indicating that the first linear precoding vector is applied to a first combination of data sets and that the second linear precoding vector is applied to a second combination of data sets, where the first combination is of a first data set for the first UE and a second data set for the second UE, and the second combination is also of the first data set for the first UE and the second data set for the second UE but is different from the first combination, transmit a first demodulation reference signal associated with the first port, transmit a second demodulation reference signal associated with the second port, and transmit a third demodulation reference signal associated with a third port at the base station, where the third demodulation reference signal includes information for extracting the first data set for the first UE and the second data set for the second UE.

Another apparatus is described. The apparatus may include means for associating a first port with a set of multiple antenna elements of an antenna array, the first port based on a first linear precoding vector and having a first phase, means for associating a second port with the set of multiple antenna elements of the antenna array, the second port based on a second linear precoding vector and a phase shift such that the second port has a second phase that is coherent with the first phase, means for transmitting, to a first UE and a second UE, control signaling indicating that the first linear precoding vector is applied to a first combination of data sets and that the second linear precoding vector is applied to a second combination of data sets, where the first combination is of a first data set for the first UE and a second data set for the second UE, and the second combination is also of the first data set for the first UE and the second data set for the second UE but is different from the first combination, means for transmitting a first demodulation reference signal associated with the first port, means for transmitting a second demodulation reference signal associated with the second port, and means for transmitting a third demodulation reference signal associated with a third port at the base station, where the third demodulation reference signal includes information for extracting the first data set for the first UE and the second data set for the second UE.

A non-transitory computer-readable medium storing code is described. The code may include instructions executable by a processor to associate a first port with a set of multiple antenna elements of an antenna array, the first port based on a first linear precoding vector and having a first phase, associate a second port with the set of multiple antenna elements of the antenna array, the second port based on a second linear precoding vector and a phase shift such that the second port has a second phase that is coherent with the first phase, transmit, to a first UE and a second UE, control signaling indicating that the first linear precoding vector is applied to a first combination of data sets and that the second linear precoding vector is applied to a second combination of data sets, where the first combination is of a first data set for the first UE and a second data set for the second UE, and the second combination is also of the first data set for the first UE and the second data set for the second UE but is different from the first combination, transmit a first demodulation reference signal associated with the first port, transmit a second demodulation reference signal associated with the second port, and transmit a third demodulation reference signal associated with a third port at the base station, where the third demodulation reference signal includes information for extracting the first data set for the first UE and the second data set for the second UE.

Some examples of the method, apparatuses, and non-transitory computer-readable medium described herein may further include operations, features, means, or instructions for transmitting, with the control signaling, an indication that the first UE may be associated with the first data set and that the second UE may be associated with the second data set.

Some examples of the method, apparatuses, and non-transitory computer-readable medium described herein may further include operations, features, means, or instructions for transmitting the control signaling via a downlink control information signal.

Some examples of the method, apparatuses, and non-transitory computer-readable medium described herein may further include operations, features, means, or instructions for generating, based on one or more channel metrics, a first set of coefficients indicative of the first combination of data sets and generating, based on the one or more channel metrics, a second set of coefficients indicative of the second combination of data sets.

Some examples of the method, apparatuses, and non-transitory computer-readable medium described herein may further include operations, features, means, or instructions for transmitting, with the third demodulation reference signal, a first indication of the first set of coefficients and a second indication of the second set of coefficients.

In some examples of the method, apparatuses, and non-transitory computer-readable medium described herein, transmitting the first indication and the second indication may include operations, features, means, or instructions for transmitting the first indication via an in-phase component of the third demodulation reference signal and transmitting the second indication via a quadrature component of the third demodulation reference signal.

Some examples of the method, apparatuses, and non-transitory computer-readable medium described herein may further include operations, features, means, or instructions for transmitting, with the control signaling, a third indication to use at least one of the first demodulation reference signal, the second demodulation reference signal, or the third demodulation reference signal for estimating the first set of coefficients and the second set of coefficients.

Some examples of the method, apparatuses, and non-transitory computer-readable medium described herein may further include operations, features, means, or instructions for transmitting, with the third demodulation reference signal, to the first UE and the second UE, a first indication of the first set of coefficients and transmitting, with a fourth demodulation reference signal associated with a fourth port, to the first UE and the second UE, a second indication of the second set of coefficients.

Some examples of the method, apparatuses, and non-transitory computer-readable medium described herein may further include operations, features, means, or instructions for transmitting, with the control signaling, a third indication to use at least one of the first demodulation reference signal, the second demodulation reference signal, the third demodulation reference signal, or the fourth demodulation reference signal for estimating the first set of coefficients and the second set of coefficients.

Some examples of the method, apparatuses, and non-transitory computer-readable medium described herein may further include operations, features, means, or instructions for transmitting, with the control signaling, an indication of a frequency granularity for estimating the first set of coefficients and the second set of coefficients.

A method is described. The method may include receiving, from a base station, control signaling indicating that a first linear precoding vector is applied to a first combination of data sets and that a second linear precoding vector is applied to a second combination of data sets, where the first combination is of a first data set for the first UE and a second data set for a second UE, and the second combination is also of the first data set for the first UE and the second data set for the second UE but is different from the first combination, receiving, from the base station via a first comb associated with a first port and a second port, a first demodulation reference signal associated with the first port and a second demodulation reference signal associated with the second port, and receiving, from the base station via a second comb associated with at least a third demodulation reference signal associated with a third port, a message including: a first indication of a first set of coefficients indicative of the first combination of data sets and a second indication of a second set of coefficients indicative of the second combination of data sets.

An apparatus is described. The apparatus may include a processor, memory coupled with the processor, and instructions stored in the memory. The instructions may be executable by the processor to cause the apparatus to receive, from a base station, control signaling indicating that a first linear precoding vector is applied to a first combination of data sets and that a second linear precoding vector is applied to a second combination of data sets, where the first combination is of a first data set for the first UE and a second data set for a second UE, and the second combination is also of the first data set for the first UE and the second data set for the second UE but is different from the first combination, receive, from the base station via a first comb associated with a first port and a second port, a first demodulation reference signal associated with the first port and a second demodulation reference signal associated with the second port, and receive, from the base station via a second comb associated with at least a third demodulation reference signal associated with a third port, a message including: a first indication of a first set of coefficients indicative of the first combination of data sets and a second indication of a second set of coefficients indicative of the second combination of data sets.

Another apparatus is described. The apparatus may include means for receiving, from a base station, control signaling indicating that a first linear precoding vector is applied to a first combination of data sets and that a second linear precoding vector is applied to a second combination of data sets, where the first combination is of a first data set for the first UE and a second data set for a second UE, and the second combination is also of the first data set for the first UE and the second data set for the second UE but is different from the first combination, means for receiving, from the base station via a first comb associated with a first port and a second port, a first demodulation reference signal associated with the first port and a second demodulation reference signal associated with the second port, and means for receiving, from the base station via a second comb associated with at least a third demodulation reference signal associated with a third port, a message including: means for a first indication of a first set of coefficients indicative of the first combination of data sets and means for a second indication of a second set of coefficients indicative of the second combination of data sets.

A non-transitory computer-readable medium storing code is described. The code may include instructions executable by a processor to receive, from a base station, control signaling indicating that a first linear precoding vector is applied to a first combination of data sets and that a second linear precoding vector is applied to a second combination of data sets, where the first combination is of a first data set for the first UE and a second data set for a second UE, and the second combination is also of the first data set for the first UE and the second data set for the second UE but is different from the first combination, receive, from the base station via a first comb associated with a first port and a second port, a first demodulation reference signal associated with the first port and a second demodulation reference signal associated with the second port, and receive, from the base station via a second comb associated with at least a third demodulation reference signal associated with a third port, a message including: a first indication of a first set of coefficients indicative of the first combination of data sets and a second indication of a second set of coefficients indicative of the second combination of data sets.

Some examples of the method, apparatuses, and non-transitory computer-readable medium described herein may further include operations, features, means, or instructions for receiving the control signaling via a downlink control information message.

Some examples of the method, apparatuses, and non-transitory computer-readable medium described herein may further include operations, features, means, or instructions for receiving, with the control signaling, a third indication that the first UE may be associated with the first data set and the second UE may be associated with the second data set.

In some examples of the method, apparatuses, and non-transitory computer-readable medium described herein, receiving the message may include operations, features, means, or instructions for receiving the first indication via an in-phase component of the third demodulation reference signal and receiving the second indication via a quadrature phase component of the third demodulation reference signal.

Some examples of the method, apparatuses, and non-transitory computer-readable medium described herein may further include operations, features, means, or instructions for receiving, with the control signaling, a third indication to use at least one of the first demodulation reference signal, the second demodulation reference signal, or the third demodulation reference signal for estimating the first set of coefficients and the second set of coefficients and estimating the first set of coefficients and the second set of coefficients based on the control signaling.

In some examples of the method, apparatuses, and non-transitory computer-readable medium described herein, receiving the message may include operations, features, means, or instructions for receiving, with the third demodulation reference signal, the first indication and receiving, with a fourth demodulation reference signal associated with a fourth port, the second indication.

Some examples of the method, apparatuses, and non-transitory computer-readable medium described herein may further include operations, features, means, or instructions for receiving, with the control signaling, a third indication to use at least one of the first demodulation reference signal, the second demodulation reference signal, the third demodulation reference signal, or the fourth demodulation reference signal for estimating the first set of coefficients and the second set of coefficients and estimating the first set of coefficients and the second set of coefficients based on the control signaling.

Some examples of the method, apparatuses, and non-transitory computer-readable medium described herein may further include operations, features, means, or instructions for receiving, with the control signaling, a third indication of a frequency granularity for estimating the first set of coefficients and the second set of coefficients and estimating the first set of coefficients and the second set of coefficients based on the third indication of the frequency granularity, the first indication, and the second indication.

DETAILED DESCRIPTION

Figure 1:
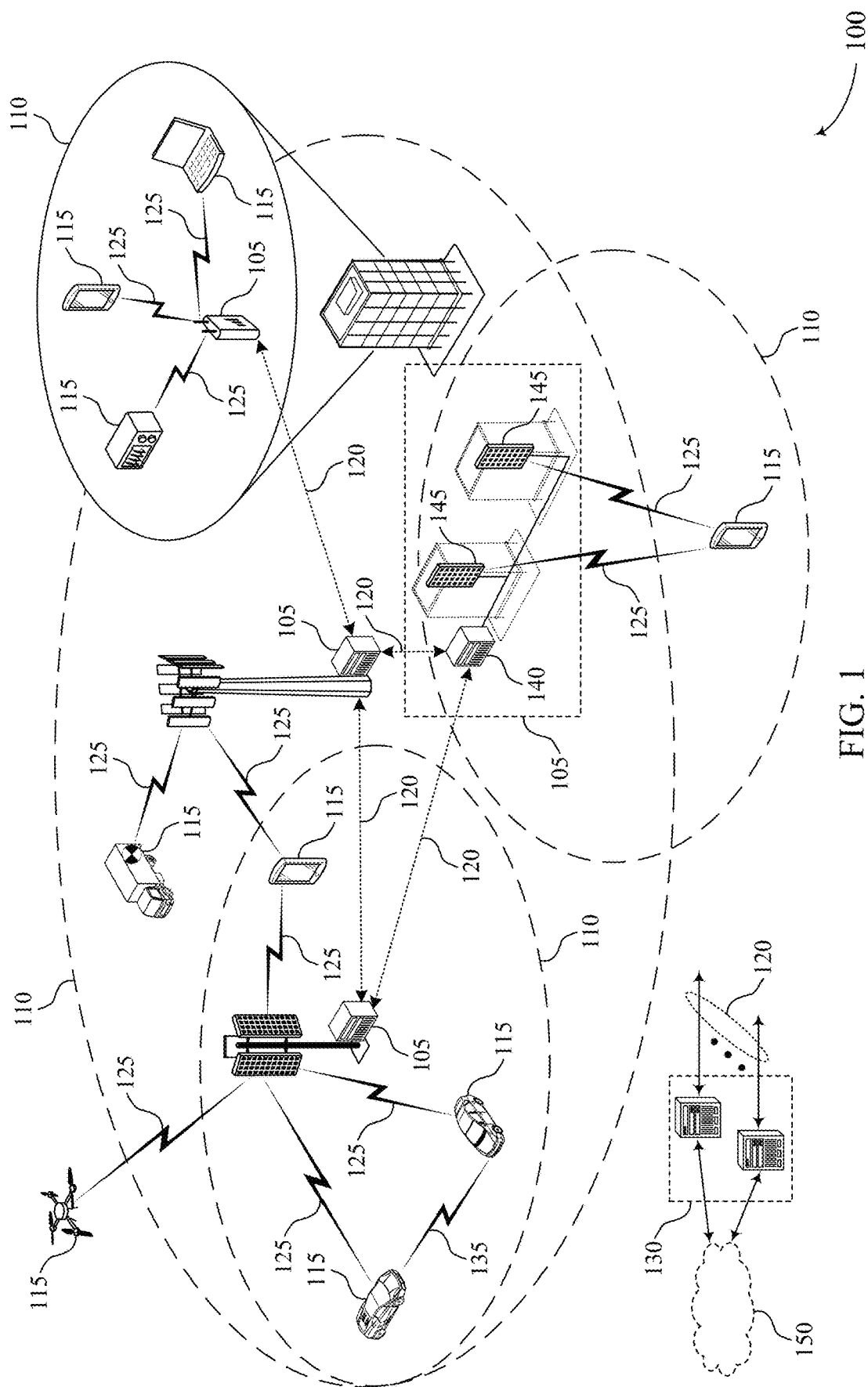
FIG. 1 illustrates an example of a wireless communications system that supports channel estimation and demodulation procedures for non-linear multi-user multiple-input multiple-output precoding in accordance with aspects of the present disclosure.

In some wireless communications systems (e.g., multiple-input multiple-output (MIMO) systems, multi-user (MU) MIMO (MU-MIMO) systems), a base station may use nonlinear precoding, such as Tomlinson-Harashima Precoding (THP). In some examples of nonlinear precoding, the base station may create two ports for a shared channel transmission that may include data for two user equipments (UEs). The base station may transmit data to a first UE using a first port, and may apply nonlinear precoding (e.g., THP) prior to transmitting data to a second UE using a second port. By applying the nonlinear precoding to the data prior to transmitting the data to the second UE, the base station may decrease an amount of interference between the transmission to the first UE via the first port and the transmission to the second UE via the second port. However, in cases where the shared channel is associated with a relatively low signal-to-noise ratio (SNR), applying THP prior to transmitting the data via the second port may effectively result in destructive interference with the transmission to the first UE via the first port, thus decreasing the power of the transmission to the first UE via the first port and increasing interference between the transmissions. Additionally, any uncanceled interference (or interference not canceled through the destructive summation of the transmissions) may still remain as noise in the transmission to the second UE via the second port.

Techniques described herein enable a base station to utilize an enhanced precoding scheme for shared channel data transmissions to two UEs. In some cases, the described techniques may increase received signal power for the transmission to a second UE, as the base station may transmit data to a first UE under low SNR conditions. The base station may associate a first port for a shared channel transmission with a set of antenna elements of an antenna array, and a second port for the shared channel transmission with the set of antenna elements of the antenna array. The first port may have a first phase and may be based on a first linear precoding vector, and the second port may be based on a second linear precoding vector and a phase shift such that the second port may have a second phase that is coherent with the first phase. That is, the base station may apply the linear precoding to generate transmissions via the first port and the second port that constructively interfere.

The base station may indicate combination coefficients to the two UEs that the UEs may utilize to extract data in the transmissions for the respective UEs. The base station may use the first port and the second port to transmit a first linear combination and a second linear combination of a first and second data set associated with the first UE and the second UE, respectively. In some examples, the base station may transmit a first demodulation reference signal (DMRS) associated with the first port and a second DMRS associated with the second port via a first comb, and transmit an indication of the combination coefficients via a second comb (e.g., via a third DMRS associated with a third port and/or a fourth DMRS associated with a fourth port). The UEs may extract data from the first and second linear combinations by applying the combination coefficients indicated via the second comb and estimating channels associated with the first DMRS and the second DMRS transmitted via the first comb.

The base station may indicate, for example via control signaling, that the base station applied the first linear precoding vector to the first combination of data and the second linear precoding vector to the second combination of data. In some examples, the linear combinations of the first data set and the second data set may be computed by a neural network and based on channel conditions. Additionally or alternatively, a constellation (e.g., a component constellation) associated with the second data set transmitted to the second UE may be conditional on a value of data in the first data set transmitted to the first UE. That is, the base station may adjust the constellation of the data for the second UE based on a value of the data for the first UE to enable the constructive interference between the transmissions from the first port and the second port when received by the second UE, which may improve the reliability of data reception for the data transmitted to the second UE.

Aspects of the disclosure are initially described in the context of wireless communications systems. Aspects of the disclosure are then descried in the context of precoding schemes, component constellations, and process flows. Aspects of the disclosure are further illustrated by and described with reference to apparatus diagrams, system diagrams, and flowcharts that relate to non-linear precoding for MU-MIMO communications.

FIG. 1 illustrates an example of a wireless communications system 100 that supports channel estimation and demodulation procedures for non-linear MU-MIMO precoding in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some wireless communications systems 100 (e.g., MIMO systems, MU-MIMO systems), one or more channels of one or more UEs 115 may be highly correlated due to a small spatial separation between the channels. For example, two UEs 115 may be located in close proximity to each other, which may increase interference between the respective channels of the UEs 115 for MU-MIMO transmissions. To reduce the impact of the high correlation, a base station 105 may apply nonlinear precoding techniques such as THP to MU-MIMO transmissions.

In some examples, using THP, the base station 105 may create two ports (e.g., beams) for a shared channel transmission (e.g., a physical downlink shared channel (PDSCH) transmission) that may include data for two UEs 115 each with one layer. For example, the base station 105 may apply a linear precoding that may convert a MU-MIMO channel (e.g., a propagation channel) into a two-by-two spatially-causal precoded channel, effectively creating the two ports (e.g., "DMRS ports") for the shared channel transmission. In some examples, the base station 105 may use a first port to transmit modulation symbols intended for a first UE 115, and the base station 105 may use the second port to transmit symbols precoded by THP to a second UE 115. That is, the base station 105 may transmit data to the first UE 115 using the first port, and may apply THP prior to transmitting data to the second UE 115 using the second port. Since the precoded channel is spatially-causal, the first UE 115 may receive a small to zero amount of the data transmitted from the second port intended for the second UE 115, while the second UE 115 may receive the data transmitted from both the first port intended for the first UE 115 and the second port intended for the second UE 115. However, the base station 105 may apply interference pre-cancellation in the form of the THP precoded symbols to the second UE 115 such that the second UE 115 may receive a reduced amount of interference from the data intended for the first UE 115.

The precoded channel (e.g., HP) may be based on applying some linear precoding to a propagation channel (e.g., 11). In some examples, the product of the propagation channel H and the linear precoding may result in the precoded channel matrix $$HP \approx \begin{bmatrix} l_{1,1} & 0 \\ l_{2,1} & l_{2,2} \end{bmatrix},$$

where H may represent a 2× Nt channel, where Nt may represent a number of physical antennas in an antenna array with $l_{i,i} > 0$, and P may represent some linear precoding matrix, for example, $P=[p_1\ p_2]$. In some cases, $p_1$ and $p_2$ may be computed from an LQ decomposition (e.g., a decomposition of matrix into the product of a lower triangular matrix (L) and unitary matrix (Q)) of [H, βI], where β may represent a regularization factor and I is an identity matrix. In HP, the first column may correspond to transmissions via the first port and the second column may correspond to transmissions via the second port. In addition, the first row in HP may correspond to a channel seen by the first UE 115, and the second row may correspond to a channel seen by the second UE 115. That is, the first UE 115 may see data transmitted from the first port (e.g., $l_{1,1}$, the channel coefficient for the data transmitted from the first port) and may fail to see data transmitted from the second port, while the second UE 115 may see data transmitted from the first port (e.g., $l_{2,1}$, the channel coefficient for the data transmitted from the first port) and the second port (e.g., $l_{2,2}$, the channel coefficient for the data transmitted from the second port).

In some examples, the base station 105 may apply the interference pre-cancellation in the form of the THP to the second port. For example, the base station 105 may apply an input value of $u_2-au_1$, where $u_1$ and $u_2$ may represent regular quadrature amplitude modulation (QAM) constellations (e.g., quadrature phase-shift keying (QPSK), 16QAM) and a may represent a pre-cancellation factor computed from an assumed channel (e.g., $l_{2,1}$) for the interfering signal from the first port received by the second UE 115 and an SNR (e.g., or a noise covariance matrix) associated with the assumed channel for the second UE. In some examples, $u_2$ may include modulation symbols carrying a message for the second UE 115. As such, the input value $u_2-au_1$ may indicate the interference pre-cancellation by cancelling a fraction of $u_1$ from $u_2$ before $u_2$ is applied to the second port and the linear precoding. In some cases, $u_1$ may include the modulation symbols for the first UE 115. In some examples, the base station 105 may apply a modulo operation (e.g., Mod) to an I-phase and a Q-phase of the input value $u_2-au_1$, which may result in the input to the second port. In some cases with a finite SNR, partial pre-cancellation may be used, and in cases with a low SNR, the base station 105 may choose a such that the base station 105 may refrain from applying a modulo operation to the input value.

In some examples, the first port may have an input value of $u_1$, which may be a direct input value to the first port (e.g., DMRS port 1, the propagation channel for the first UE 115). The base station 105 may apply the linear precoding matrix $P=[p_1\ p_2]$ to form the first port and the second port (e.g., DMRS port 2, the propagation channel for the second UE 115), and the base station 105 may use the first port to transmit the modulation symbols to the first UE 115 and the second port to transmit the THP precoded symbols to the second UE 115. THP precoding may introduce a shaping loss in high SNR scenarios (e.g., 1.53 dB), a modulo loss in low SNR scenarios, and a power loss at low order modulation (e.g., QPSK). That is, for cases with a high SNR, a dominant source of loss for THP precoding may be shaping loss, and for cases with a low SNR, a dominant source of loss for THP precoding may be power and modulo losses in addition to shaping loss. In some examples, the losses may be mitigated by scaling a at the base station 105 (e.g., by using a partial interference pre-cancellation), by disabling modulo operations at a UE 115, by utilizing maximum-likelihood decoding, or any combination thereof. However, any interference the base station 105 fails to cancel may still remain as noise to the UE 115 for which the THP is applied (e.g., the second UE 115). As such, in cases with a low SNR, applying the THP prior to transmitting data via the second port may lack performance benefits over optimized linear precoding such as regularized zero-forcing precoding.

In some cases, a base station 105 may use an enhanced precoding scheme for shared channel data transmissions to two UEs 115. In some cases, the described techniques may increase received signal power for the transmission to a second UE 115, as the base station 105 may transmit data to a first UE 115 under low SNR conditions. The base station 105 may associate a first port for a shared channel transmission with a set of antenna elements of an antenna array, and a second port for the shared channel transmission with the set of antenna elements of the antenna array. The first port may have a first phase and may be based on a first linear precoding vector, and the second port may be based on a second linear precoding vector and a phase shift such that the second port may have a second phase that is coherent with the first phase. That is, the base station 105 may apply the linear precoding to generate transmissions via the first port and the second port that constructively interfere.

In some examples, the base station 105 may use the first port and the second port to transmit data associated with both the first UE 115 and the second UE 115. For example, the base station 105 may use the first port to transmit a first DMRS and a second DMRS including a first linear combination and a second linear combination, respectively, of a first data set for the first UE 115 and a second data set for the second UE 115 to the first UE 115 and the second UE 115. The base station 105 may indicate, for example via control signaling, that the base station 105 will use linear precoding to generate transmissions. For example, the base station 105 may indicate via control signaling that the base station 105 applied the first linear precoding vector to the first combination of data and the second linear precoding vector to the second combination of data. In some examples, the linear combinations of the first data set and the second data set may be computed by a neural network and based on channel conditions. Additionally or alternatively, a constellation (e.g., a component constellation) associated with the second data set transmitted to the second UE 115 may be conditional on a value of data in the first data set transmitted to the first UE 115. That is, the base station 105 may adjust the constellation of the data for the second UE 115 based on a value of the data for the first UE 115 to enable the constructive interference between the transmissions from the first port and the second port when received by the second UE 115, which may improve the reliability of data reception for the data transmitted to the second UE 115.

The base station 105 may generate combination coefficients indicating the first combination of the first data set and the second data set and the second combination of the first data set and the second data set. In some examples, combination coefficients may be used by the first UE 115 and the second UE 115 to extract the first and second data sets from the first linear combination and the second linear combination. In some examples, the base station 105 may transmit a first DMRS associated with the first port and a second DMRS associated with the second port via a first comb, and transmit an indication of the combination coefficients via a second comb (e.g., via a third DMRS associated with a third port and/or a fourth DMRS associated with a fourth port).

Figure 2:
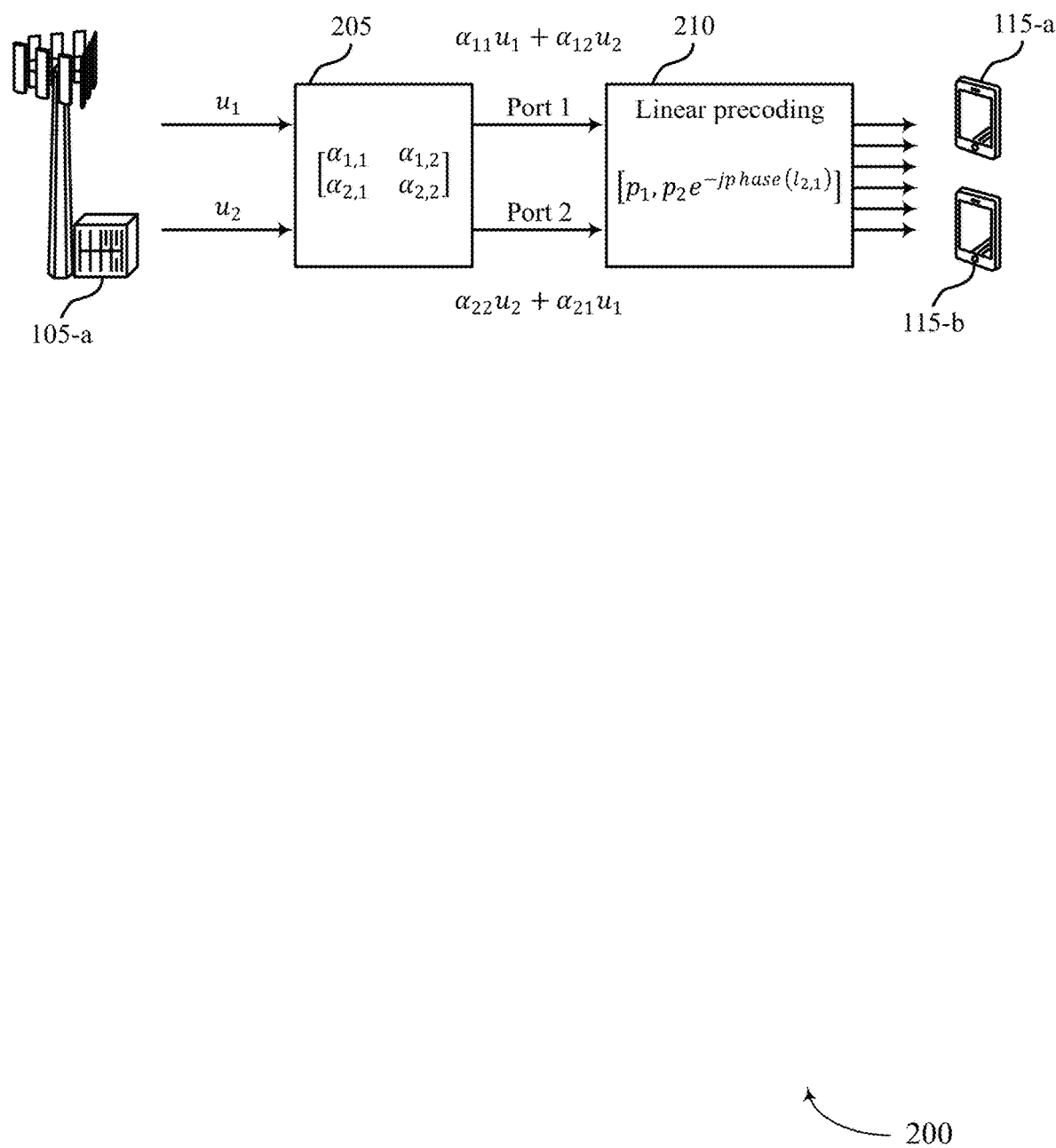
FIG. 2 illustrates an example of a precoding scheme that supports channel estimation and demodulation procedures for non-linear multi-user multiple-input multiple-output precoding in accordance with aspects of the present disclosure.

FIG. 2 illustrates an example of a precoding scheme 200 that supports channel estimation and demodulation procedures for non-linear MU-MIMO precoding in accordance with aspects of the present disclosure. In some examples, the precoding scheme 200 may implement aspects of the wireless communications system 100 or may be implemented by aspects of the wireless communications system 100. The precoding scheme 200 may include a component constellation $u_1$ and a component constellation $u_2$, which may correspond to data a base station 105-*a* may transmit to a UE 115-*a* and a UE 115-*b*, respectively. Additionally or alternatively, the precoding scheme 200 may include a linear transformation matrix 205 and a linear precoding matrix 210.

The precoding scheme 200 may support enhanced precoding for shared channel data transmissions to the UEs 115. In some examples, the base station 105-a may associate a port 1 (e.g., a first port) with a set of antenna elements of an antenna array, where the port 1 may have a first phase based on a first linear precoding vector. The port 1 may be associated with a propagation channel, and the base station 105-a may apply the first linear precoding vector to the propagation channel such that the propagation channel becomes a precoded channel. Additionally or alternatively, the port 1 may be associated with the component constellation $u_1$ for transmitting data to the UE 115-a. In some examples, the base station 105-a may associate a port 2 (e.g., a second port) with the set of antenna elements of the antenna array, where the port 2 may be based on a second linear precoding vector. The port 2 may be associated with the propagation channel, and the base station 105-a may apply the second linear precoding vector to the propagation channel such that the propagation channel becomes a precoded channel (e.g., HP). Additionally or alternatively, the port 2 may be associated with the component constellation $u_2$ for transmitting data to the UE 115-b. In some cases, the port 2 may have a phase shift such that the port 2 has a second phase that is coherent with (e.g., constructively interferes with) the first phase. As such, the precoded channel may be a two-by-two spatially-causal channel based on the port 2 having the second phase that is coherent with the first phase.

In some cases, the base station 105-a may use the component constellation $u_1$ and the component constellation $u_2$ to communicate messages to the UE 115-a and the UE 115-b, respectively, where $u_1$ may be from a regular QPSK constellation and $u_2$ may be from a QPSK constellation that depends on $u_1$. In some examples, the component constellation $u_1$ may be associated with the first data set for the UE 115-a and the component constellation $u_2$ may be associated with the second data set for the UE 115-b. As described with reference to FIG. 3, the base station 105-a may transmit different constellation points of the constellation component $u_1$ to the UE 115-a, and the base station 105-a may transmit different constellation points of the component constellation $u_2$ to the UE 115-b based on the constellation points transmitted to the UE 115-a.

In some examples, the base station 105-a may generate a first set of coefficients indicating the first combination of the first data set and the second data set, and a second set of coefficients indicating the second combination of the first data set and the second data set based on one or more channel metrics. For example, the base station 105-a may apply a linear transformation matrix 205 to the component constellation $u_1$ and the component constellation $u_2$. The linear transformation matrix 205 may be given as $$\begin{bmatrix} \alpha_{1,1} & \alpha_{1,2} \\ \alpha_{2,1} & \alpha_{2,2} \end{bmatrix},$$

where $a_{i,j}>0$ may represent linear combining coefficients for a first data set for the UE 115-a and a second data set for the UE 115-b, and where $a_{i,j}$ may be determined from the propagation channel H (e.g., an assumed downlink channel) and an SNR corresponding to the propagation channel H, or by a neural network. Applying the linear transformation matrix 205 may result in linear combinations of contributions (e.g., data) from the component constellation $u_1$ and the component constellation $u_2$ corresponding to the port 1 and the port 2. For example, the output of the linear transformation matrix 205 may be $a_{11}u_1+a_{12}u_2$ for the port 1 and $a_{22}u_2+a_{11}u_1$ for the port 2, where each coefficient in the linear combinations may be a positive, real number. For example, the linear combination $a_{11}u_1+a_{12}u_2$ corresponding to the port 1 may include a first combination of the first data set for the UE 115-a (e.g., $a_{11}u_1$) and the second data set for the UE 115-b (e.g., $a_{12}u_2$), and the linear combination $a_{22}u_2+a_{11}u_1$ corresponding to the port 2 may include a second combination of the first data set for the UE 115-a (e.g., $a_{11}u_1$) and the second data set for the UE 115-b (e.g., $a_{22}u_2$). As described herein, the base station may transmit an indication of the combination coefficients to the first and second UEs 115.

In some cases, the base station 105-a may use a neural network to compute the linear combination coefficients $a_{i,j}$, where the inputs to the neural network may include the one or more channel metrics. For example, channel state information at the transmitter (CSIT) (e.g., at the base station 105) may be input to a neural network (e.g., a multi-layer perception (MLP)) to compute $a_{i,j}$, which are used to compute the inputs for the port 1 and the port 2 (e.g., the linear combinations of the contributions from the component constellation $u_1$ and the component constellation $u_2$). Additionally or alternatively, CSIT may be used for training data generation and the generated training data can be input to a backpropagation-based solver to compute $a_{i,j}$. In some examples, the channel metrics (e.g., the CSIT) may include an estimate of the precoded channel HP, a downlink SNR, a noise covariance expected at downlink precoded channel, or any combination thereof.

In some cases, the base station 105-a may apply the linear precoding matrix 210 to the linear combinations of the contributions from the component constellation $u_1$ and the component constellation $u_2$. For example, the base station 105-a may apply a first linear precoding vector of the linear precoding matrix 210 (e.g., $p_1$) to a first input (e.g., $a_{11}u_1+a_{12}u_2$ corresponding to the port 1) and a second linear precoding vector of the linear precoding matrix 210 (e.g., $p_2 e^{jphase(l_{2,1})}$) to a second input (e.g., $a_{22}u_2+a_{21}u_1$ corresponding to the port 2). Put another way, $p_1(a_{11}u_1+a_{12}u_2)$ and $p_2 e^{jphase(l_{2,1})}(a_{22}u_2+a_{11}u_1)$ may be input to the same set of antenna elements. The linear precoding matrix 210 may be given as $[p_1 \ p_2 e^{jphase(l_{2,1})}]$, where $p_1$ and $p_2$ may be computed from an LQ decomposition of the downlink channel H to make H a spatially-causal channel, where $$HP = H\begin{bmatrix} p_1 & p_2 e^{jphase(l_{2,1})} \end{bmatrix} = \begin{bmatrix} l_{1,1} & 0 \\ l_{2,1} & l_{2,2} e^{jphase(l_{2,1})} \end{bmatrix},$$

$l_{i,i}>0$ (e.g., $l_{1,1}$ and $l_{2,2}$ are positive and real valued). In some examples, $e^{jphase(l_{2,1})}$ may represent a phase rotation used to match the phase of the contribution from the port 2 to the phase of an interfering channel (e.g., the channel coefficient for the port 1, $l_{2,1}$) such that the contributions from both ports add coherently (e.g., constructively interfere) at the UE 115-b. The first phase of the first port may be given by the phase of $l_{2,1}$, and the second phase of the second port may be given by the phase of $l_{2,2}e^{jphase(l_{2,1})}$. For example, the base station 105-a may apply the linear precoding in the form of $p_1$ to the port 1 and the linear precoding in the form of $p_2 e^{jphase(l_{2,1})}$ to the port 2, which may turn the propagation channel H (e.g., a downlink MU-MIMO channel) into a two-by-two spatially-causal channel, effectively creating the two ports for PDSCH transmissions.

In some examples, the base station 105-*a* may transmit the first and second combinations of the first data set and the second data set (e.g., the first input and the second input) to both the UE 115-*a* and the UE 115-*b*, after applying the linear precoding matrix 210. For example, the base station 105-*a* may use a first transmission beam corresponding to the port 1 to transmit the first input (e.g., $a_{11}u_1+a_{12}u_2$) to the UE 115-*a* and the UE 115-*b*, and a second transmission beam corresponding to the port 2 to transmit the second input (e.g., $a_{21}u_1+a_{22}u_2$) to the UE 115-*b*. Additionally or alternatively, the base station 105-*a* may transmit on a first portion of the precoded channel (e.g., HP) generated by applying the first linear precoding vector (e.g., $p_1$) to the propagation channel (e.g., H) using the first transmission beam corresponding to the port 1. The first portion of the precoded channel may correspond to the first column of HP given by a vector $$\begin{bmatrix} l_{1,1} \\ l_{2,1} \end{bmatrix}.$$

The transmission from the port 1 may reach both the UE 115-*a* and the UE 115-*b*. The base station 105-*a* may transmit on a second portion of the precoded channel (e.g., HP) generated by applying the second linear precoding vector (e.g., $p_2 e^{jphase(l_{2,1})}$) to the propagation channel (e.g., H) using the second transmission beam corresponding to the port 2. The second portion of the precoded channel may correspond to the second column of HP, given by a vector $$\begin{bmatrix} 0 \\ l_{2,2} e^{jphase(l_{2,1})} \end{bmatrix}.$$

The transmission from the port 2 may reach the UE 115-*b*. In some examples, the precoded channel HP may be the two-by-two spatially-causal channel based on the port 2 having the second phase (e.g., the phase of the channel coefficient $l_{2,2} e^{jphase(l_{2,1})}$) that is coherent with the first phase (e.g., the phase of the channel coefficient $l_{2,1}$).

In some cases, if the base station 105-*a* finds $a_{11}, a_{12}, a_{21}$, and $a_{22}$ such that $a_{i,j} > 0$, $a_{11}^2 + a_{12}^2 = 1$, $a_{21}^2 + a_{22}^2 = 1$, then the power allocation among the ports (e.g., DMRS ports 1 and 2) may be such that $\|p_1\|^2 + \|p_2\|^2 = 1$. In some examples, $a_{i,j}$ may vary across precoding resource groups, and $a_{i,j}$ may be based on a precoding resource group granularity or finer.

For the UE 115-*a*, the signal portion of the data transmission (e.g., the PDSCH) received by the UE 115-*a* may be given by $l_{1,1} (a_{1,1}u_1 + a_{1,2}u_2)$ where the UE 115-*a* may estimate $l_{1,1}$ based on a received DMRS transmitted from the DMRS port 1. If the base station 105-*a* conveys $a_{1,1}$ to the UE 115-*a*, the UE 115-*a* may compute $a_{1,2}$ by $a_{1,2} = \sqrt{1-a_{1,1}^2}$. Accordingly, the UE 115-*a* may decode a PDSCH associated with the UE 115-*a* if the base station 105-*a* conveys the coefficient $a_{1,1}$ to the UE 115-*a*.

For the UE 115-*b*, the signal portion of the data transmission (e.g., the PDSCH) received by the UE 115-*b* may be given by $e^{jphase(l_{2,1})} l_{2,2} [\varphi_1 u_1 + \varphi_2 u_2]$, where $$\varphi_1 = \frac{l_{2,1}}{e^{jphase(l_{2,1})} l_{2,2}} a_{1,1} + a_{2,1} \text{ and } \varphi_2 = \frac{l_{2,1}}{e^{jphase(l_{2,1})} l_{2,2}} a_{1,2} + a_{2,2}.$$

The UE 115-*b* may estimate $l_{2,1}$ based on a received DMRS transmitted from the DMRS port 1. The UE 115-*b* may estimate $e^{jphase(l_{2,1})} l_{2,2}$ based on a received DMRS transmitted from the DMRS port 2. If the base station 105-*a* conveys $a_{1,1}$ and $a_{2,2}$ to the UE 115-*b*, the UE 115-*b* may compute $a_{1,2}$ and $a_{2,1}$ by $a_{1,2} = \sqrt{1-a_{1,1}^2}$ and $a_{2,1} = \sqrt{1-a_{2,2}^2}$. Accordingly, the UE 115-*b* may decode the PDSCH associated with the UE 115-*b* if the base station 105-*a* conveys the coefficients $a_{1,1}$ and $a_{2,2}$ to the UE 115-*b*.

Once the UEs 115-*a* and 115-*b* know the combination coefficients $a_{i,j}$ (i.e., $a_{11}, a_{12}, a_{21}, a_{22}$) and estimate the channels observed from DMRS ports 1 and 2, the UEs 115-*a* and 115-*b* may perform maximum likelihood demapping to compute the bit log likelihood ratios. And if leakage to the UE 115-*a* from the interfering channel for DMRS port 2 is negligible, the UE 115-*a* may decode the PDSCH associated with the UE 115-*a* based on $a_{11}$ and $a_{12}$ while treating the interference from the DMRS port 2 as Gaussian noise. As described herein, the UEs 115-*a* and 115-*b* may perform maximum likelihood demapping if the UEs 115-*a* and 115-*b* know the linear combination coefficients $a_{i,j}$ ($a_{11}, a_{12}, a_{21}, a_{22}$), and if the UEs 115-*a* and 115-*b* know on $a_{11}$ and $a_{22}$, the UEs 115-*a* and 115-*b* may compute $a_{12}$ and $a_{21}$. As described herein, the base station 105-*a* may convey the linear combination coefficients (e.g., $a_{11}$ and $a_{22}$) using one or more additional ports (e.g., DMRS ports 3 and/or 4).

Figure 3:
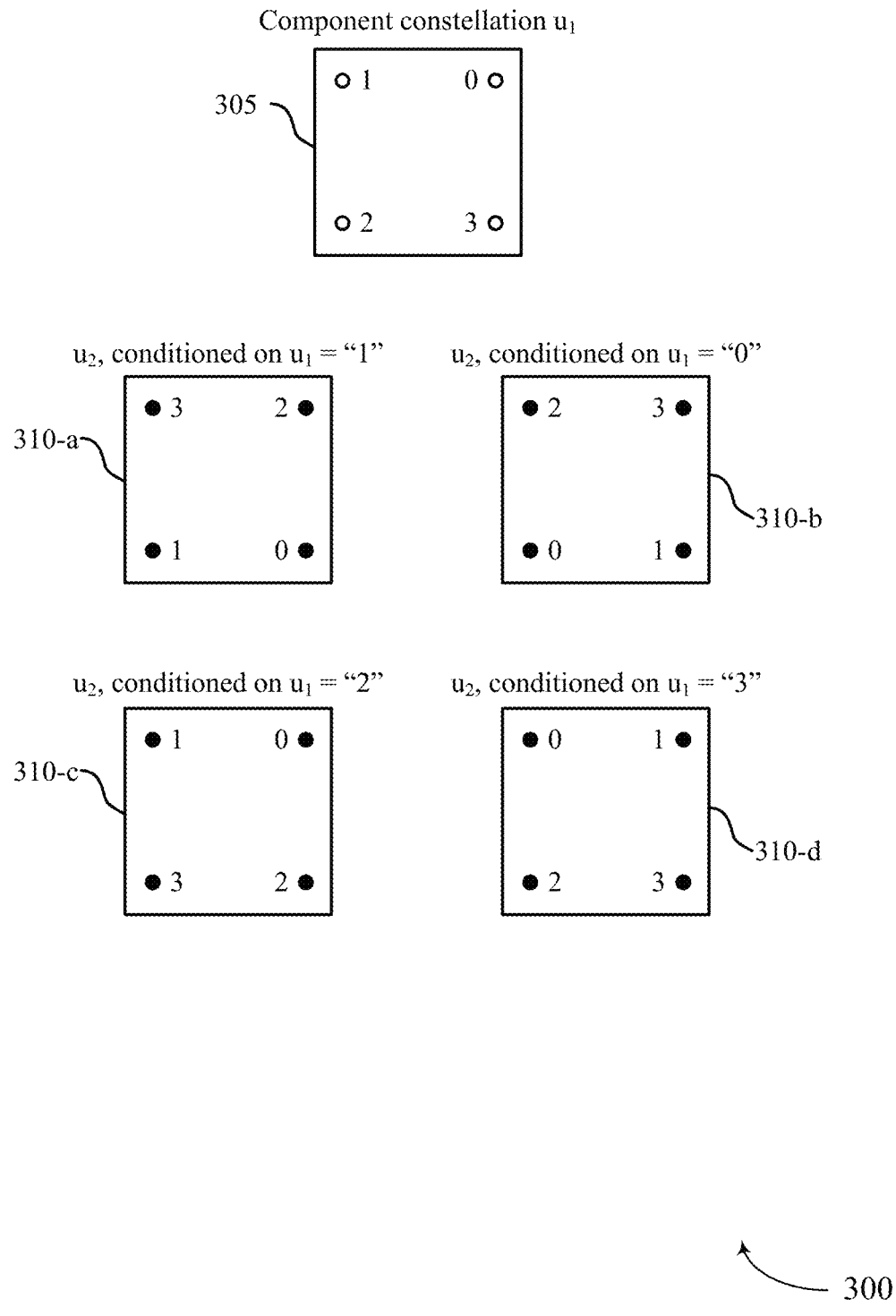
FIG. 3 illustrates examples of component constellations that support channel estimation and demodulation procedures for non-linear multi-user multiple-input multiple-output precoding in accordance with aspects of the present disclosure.

FIG. 3 illustrates an example of a component constellation 300 that supports channel estimation and demodulation procedures for non-linear MU-MIMO precoding in accordance with aspects of the present disclosure. In some examples, the component constellation 300 may implement aspects of the wireless communications system 100 or may be implemented by aspects of the wireless communications system 100.

As described herein, a base station may use an enhanced precoding scheme for shared channel data transmissions to two UEs. In some examples, the base station 105-*a* may use different component constellations $u_1$ and $u_2$ to communicate messages to two UEs. For example, the base station may use a component constellation 305 (e.g., a component constellation $u_1$) to communicate with a first UE, where $u_1$ may be from a regular QPSK constellation, and the base station may use a component constellation 310 (e.g., a component constellation $u_2$) to communicate with a second UE, where $u_2$ may be from a QPSK constellation that depends on $u_1$. That is, what the base station transmits to the second UE may depend on what the base station transmits to the first UE. In some examples, the component constellation 305 may be associated with a first data set (e.g., including modulation symbols) for the first UE, and the component constellation 310 may be associated with a second data set (e.g., including modulation symbols) for the second UE.

The component constellation 305 may include four constellation points (e.g., 0, 1, 2, 3), each of which the base station may use to transmit a message to the first UE. For example, the base station may send a message 0 to the first UE using a constellation point 0, a message 1 using a constellation point 1, a message 2 using a constellation point 2, and a message 3 using a constellation point 3. That is, the base station may send one of the four constellation points to the first UE based on the message the base station may select to send. In some cases, the component constellation 305 may be a regular QPSK constellation, where the base station may transmit one of the four constellation points in the component constellation 305 according to the message that is intended for the first UE.

In some cases, the base station may transmit messages to the second UE using a component constellation 310 which may be based on the constellation point from the component constellation 305 the base station used to transmit a message to the first UE. For example, the base station may adjust the component constellation 310 based on the first data set (e.g., the component constellation $u_1$).

In some examples, the base station may use a component constellation 310-a which may represent a component constellation $u_2$ conditioned on $u_1$="1," a component constellation 310-b which may represent a component constellation $u_2$ conditioned on $u_1$="0," a component constellation 310-c which may represent a component constellation $u_2$ conditioned on $u_1$="2," and a component constellation 310-d which may represent a component constellation $u_2$ conditioned on $u_1$="3." The base station may adjust (e.g., use) each modulation symbol of the second data set (e.g., $u_2$) based on a corresponding value indicated by each respective symbol of the first data set (e.g., $u_1$). For example, if the base station transmits a message 1 to the first UE using the constellation point 1 from the component constellation 305 (e.g., $u_1$="1"), then the base station may transmit a message to the second UE using one of the four constellation points in the component constellation 310-a which is conditioned on $u_1$="1." If the base station transmits a message 0 to the first UE using the constellation point 0 from the component constellation 305 (e.g., $u_1$="0"), then the base station may transmit a message to the second UE using one of the four constellation points in the component constellation 310-b which is conditioned on $u_1$="0," and so on.

In some examples, the four component constellations 310 may each be a regular QPSK component constellation with a distinct message labeling that may correspond to a distinct message transmitted to the first UE. For example, the base station may use a particular component constellation 310 based on which component constellation 310 corresponds to the message transmitted to the UE. In some examples, where the component constellation 305 (e.g., corresponding to the first data set) includes a QPSK constellation and a component constellation 310 (e.g., corresponding to the second data set) includes a second QPSK constellation, the base station may adjust the component constellation 310 by adjusting a labeling of the component constellation 310 based on the first data set.

In some examples, the input to the port 1 may be a linear combination of a first modulation symbol from the component constellation 305 (e.g., a first constellation point) and a second modulation symbol from a component constellation 310 conditioned on the first modulation symbol (e.g., a second constellation point conditioned on the first constellation point). That is, the input to the port 1 may be a combination of a first data set corresponding to the first UE and a second data set corresponding to the second UE. Additionally or alternatively, the input to the port 2 may be a different linear combination of a first modulation symbol from the component constellation 305 (e.g., a first constellation point) and a second modulation symbol from a component constellation 310 conditioned on the first modulation symbol (e.g., a second constellation point conditioned on the first constellation point). That is, the input to the port 1 may be a different combination of a first data set corresponding to the first UE and a second data set corresponding to the second UE.

As described with reference to FIG. 2, the base station may use the component constellation 305 and a component constellation 310 to transmit messages to the first UE and the second UE, respectively. The component constellation 305 (e.g., $u_1$) and the component constellation 310 (e.g., $u_2$) may correspond to a first UE and a second UE, respectively, and may be input to a linear transformation matrix followed by a linear precoding matrix before being transmitted to the UEs.

Figure 4:
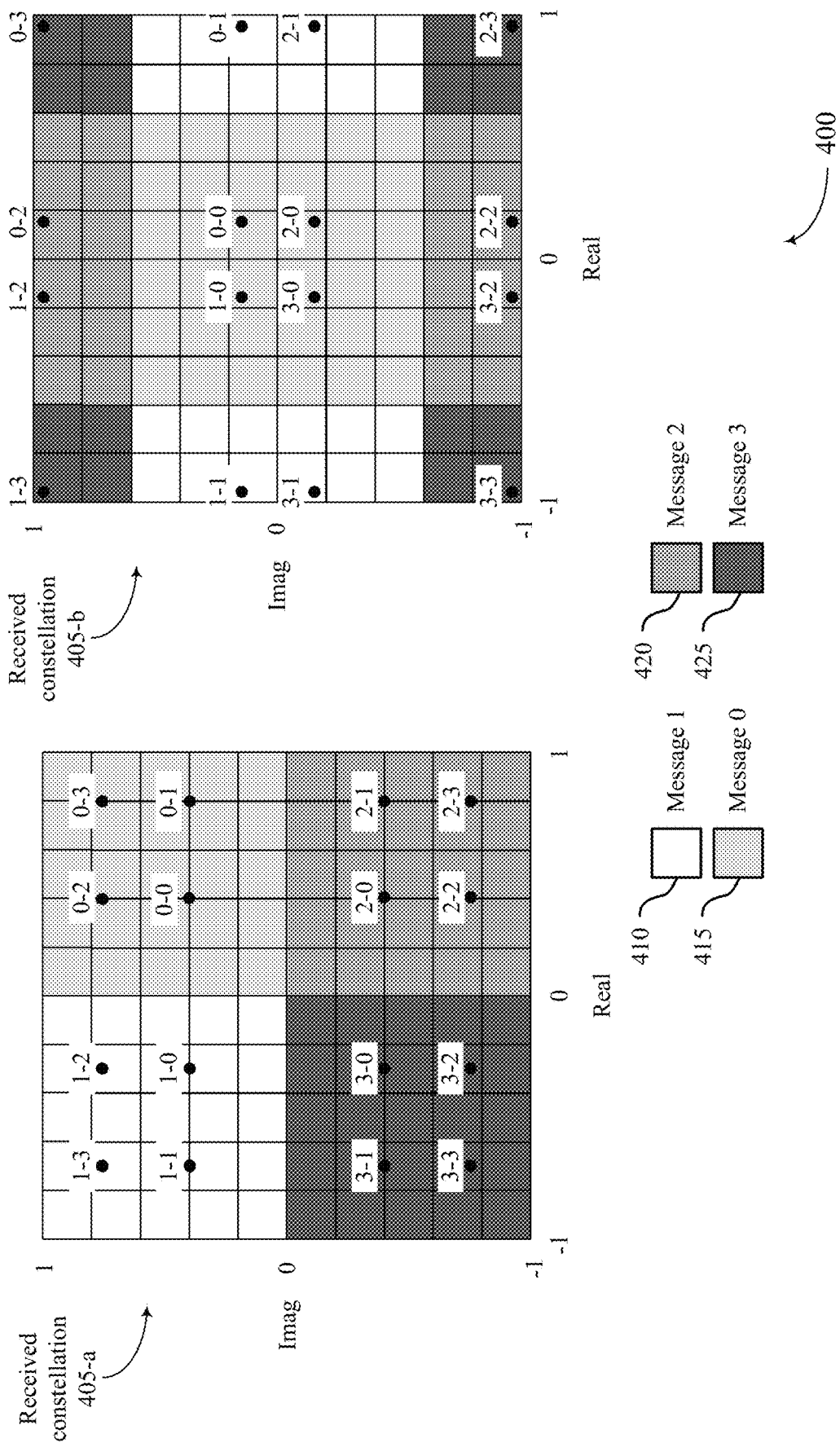
FIG. 4 illustrates examples of received constellations that support channel estimation and demodulation procedures for non-linear multi-user multiple-input multiple-output precoding in accordance with aspects of the present disclosure.

FIG. 4 illustrates an example of a received constellation 400 that supports channel estimation and demodulation procedures for non-linear MU-MIMO precoding in accordance with aspects of the present disclosure. The received constellation 400 may include a received constellation 405-a received by the first UE (e.g., UE1) and a received constellation 405-b received by a second UE (e.g., UE2).

As described herein, a base station may use an enhanced precoding scheme for shared channel data transmissions to two UEs. For example, the base station may use a component constellation $u_1$ and a component constellation $u_2$ to transmit messages to a first UE and a second UE. The first UE may receive the received constellation 405-a and the second UE may receive the received constellation 405-b.

In some examples, a channel corresponding to the first UE (e.g., UE1 channel) and a channel corresponding to the second UE (e.g., UE2 channel) may be in close spatial proximity to each other such that the angle between the two channels may be small. In some cases, the port 1 and the port 2 (e.g., corresponding to channels used for transmissions to the UEs) may be formed from an LQ composition of a downlink channel (e.g., H, as described with reference to FIGS. 2 and 3). In some examples, the port 1 may be directly aligned with the channel for the first UE. However, the port 2 may be orthogonal to the port 1, and as such, the port 2 may be misaligned with the channel for the second UE (e.g., as the channels for the first and second UEs are separated by a small angle).

In some cases, when the channels for the first UE and second UE are close together, and when the port 1 and the port 2 are orthogonal, the second UE may see a contribution from a signal intended for (e.g., transmitted to) the first UE using the port 1 in addition to the signal intended for (e.g., transmitted to) the second UE using the port 2. That is, the signal transmitted to the first UE using the port 1 may have a large contribution to the second UE. In some cases, to prevent the second UE from seeing the signal intended for the first UE as noise, a base station may use a hierarchical modulation scheme to use the signal intended for the first UE in a constructive way in delivering a message to the second UE using the port 2. In some examples, the second UE may receive both the $u_1$ component and the $u_2$ component from the port 1 and the port 2 with a large power to maximize a distance between hypotheses for each of two bits (e.g., bit=0 and bit=1). For example, each UE may receive two bits. For the highly correlated channels corresponding to the first UE and the second UE, the port 2 may be less efficient than the port 1 in delivering power. As such, the base station may transmit the component constellation $u_2$ corresponding to the second UE on the port 1 in addition to the component constellation $u_1$ to the extent that an overall mutual information delivered to both UEs is maximized. That is, to maximize the amount of information transmitted to the second UE, the base station may maximize the distance between the hypotheses for each of the two bits, which may be determined by a received power in the component constellations $u_1$ and $u_2$.

The received constellation 405-a for the first UE (e.g., UE1) and the received constellation 405-b for the second UE (e.g., UE2) may each include multiple received constellation points denoted by the labels x and y (e.g., denoted as the composite labels "x-y" in FIG. 4). The received constellation points may correspond to a message the base station may transmit to the first UE and the second UE. For example, the received constellation 405-*a* may illustrate the composite constellation points the first UE may receive, and the received constellation 405-*b* may illustrate the composite constellation points the second UE may receive. As described with reference to FIG. 3, the label x may correspond to a message transmitted to the first UE via a given constellation point (e.g., x={0, 1, 2, 3}) and the label y may correspond to a message transmitted to the second UE via a given constellation point based on the message transmitted to the first UE (e.g., y={0, 1, 2, 3}). Because each UE may receive two bits, each UE may receive four possible messages (e.g., 0, 1, 2, 3). For both the received constellation 405-*a* and the received constellation 405-*b*, a constellation point in a decision region 410 may correspond to a message 1, a constellation point in a decision region 415 may correspond to a message 0, a constellation point in a decision region 420 may correspond to a message 2, and a constellation point in a decision region 425 may correspond to a message 3.

Additionally or alternatively, the labels x-y in the received constellation 405-*a* and the received constellation 405-*b* may indicate which message the first UE and the second UE may receive. For example, a received constellation point with a label 1-3 in the received constellation 405-*a* and the received constellation 405-*b* may indicate that the first UE may receive a message 1 corresponding to bits 01 and the second UE may receive a message 3 corresponding to bits 11 via the indicated constellation point with the label 1-3. In some cases, a received constellation point with a label 2-1 in the received constellation 405-*a* and the received constellation 405-*b* may indicate that the first UE may receive a message 2 and the second UE may receive a message 1 via the indicated constellation point with the label 2-1.

As shown in the received constellation 405-*b* for the second UE, the base station may transmit a message 0 to the second UE, which may correspond to one of the received constellation points with a label 0-0,1-0,2-0, or 3-0 in the decision region 415 based on which constellation point (e.g., 0, 1, 2, or 3) was transmitted to the first UE, or the base station may transmit a message 3 to the second UE, which may correspond to one of the received constellation points with a label 0-3,1-3,2-3, or 3-3 in the decision region 425 based on which constellation point (e.g., 0, 1, 2, 3) was transmitted to the first UE.

In some examples, interference (e.g., by means of phase alignment) from the port 1 (e.g., a message intended for the first UE) may be constructively added to what is received from the port 2 to construct the received constellation 405-*b* intended for the second UE. That is, the contribution from the port 1 seen by the second UE may be added constructively to the contribution from the port 2 seen by the second UE rather than being disregarded as noise. As such, the received constellation 405-*b* may achieve a performance gain at low SNR (e.g., <8 dB) and sufficiently high channel correlation.

Figure 5:
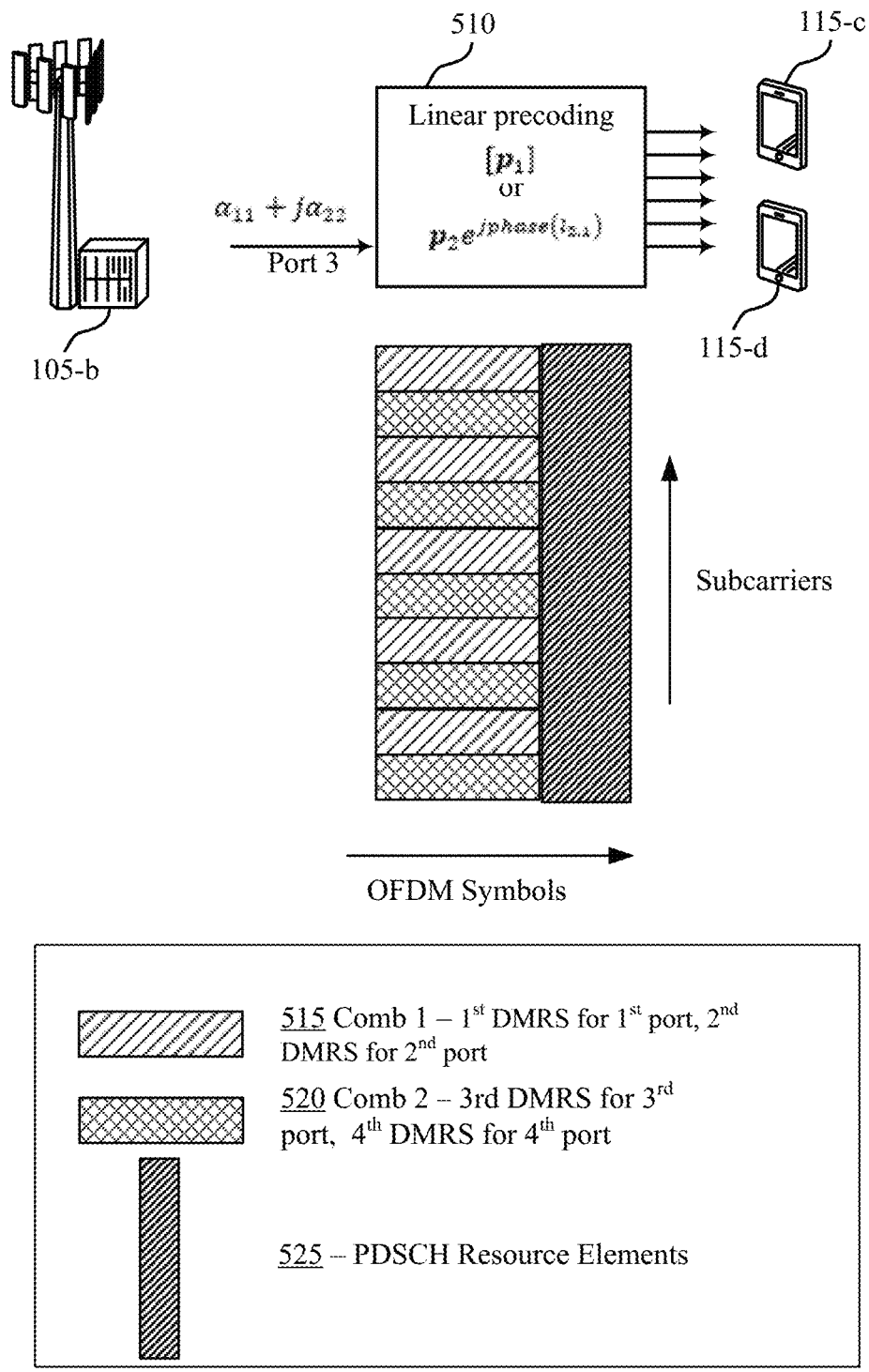
FIG. 5 illustrates an example of a precoding scheme that supports channel estimation and demodulation procedures for non-linear multi-user multiple-input multiple-output precoding in accordance with aspects of the present disclosure.

FIG. 5 illustrates an example of a precoding scheme 500 that supports channel estimation and demodulation procedures for non-linear MU-MIMO precoding in accordance with aspects of the present disclosure. In some examples, the precoding scheme 500 may implement aspects of the wireless communications system 100 or the precoding scheme 200 or may be implemented by aspects of the wireless communications system 100 or the precoding scheme 200. The precoding scheme 500 may include a linear precoding matrix 210 which may be used to precode an indication of combination coefficients that may be transmitted to a UE 115-*c* and a UE 115-*d* using a second comb. The precoding scheme 500 may include a linear precoding matrix 510.

As illustrated, a first comb 515 including even subcarriers may be used to transmit a first DMRS from DMRS port 1 and a second DMRS from DMRS port 2, and a second comb 520 including odd subcarriers may be used to transmit a third DMRS from a DMRS port 3 or a fourth DMRS from a DMRS port 4.

The second comb 520 may be used to transmit an indication of the combination coefficients $a_{1,1}$ and $a_{2,2}$. In some cases, the base station 105-*a* may apply the linear precoding matrix 510 to the input of the combination coefficients $a_{1,1}$ and $a_{2,2}$. As described herein, the first UE 115-*c* and the second UE 115-*d* may decode the shared channel transmissions transmitted over the first port and the second port if the first UE 115-*c* and the second UE 115-*d* are aware of the combination coefficients $a_{1,1}$ and $a_{2,2}$. In some examples, the shared data channel transmissions transmitted over the first port and the second port may be transmitted over PDSCH resource elements 525.

In some examples, the indication of combination coefficients $a_{1,1}$ and $a_{2,2}$ may be transmitted using a DMRS associated with DMRS port 3. In some examples, the I-phase of the DMRS resource elements may be used to signal combination coefficient $a_{1,1}$ and the Q-phase of the DMRS resource elements may be used to signal combination coefficient $a_{2,2}$. Such a configuration may correspond to and be indicated by the "Antenna port" field in downlink control information (DCI) being set to a value of "9" when the "DMRS-Type" field in DCI is set to "1" and the "maxLength" field in DCI is set to "1."

In some examples, DMRS port 3 may be used to indicate combination coefficient $a_{1,1}$ and DMRS port 4 may be used to indicate combination coefficient $a_{2,2}$. In some examples, the DMRS port 3 and DMRS port 4 may be multiplexed using an orthogonal cover code. Such a configuration may correspond to and be indicated by the "Antenna port" field in DCI being set to a value of "10" when the "DMRS-Type" field in DCI is set to "1" and the "maxLength" field in DCI is set to "1."

The base station 105-*b* may select the linear precoding vector used for either DMRS port 1 or DMRS port 2 based on which port is more power efficient. In some examples, the base station 105-*b* may indicate to the UEs 115-*c* and 115-*d* a frequency granularity for estimating the linear combination coefficients $a_{1,1}$ and $a_{2,2}$, for example to enable frequency domain averaging for the UEs 115-*c* and 115-*d* to estimate linear combination coefficients (e.g., 2 resource elements, 4 resource elements, 6 resource elements, etc.).

Figure 6:
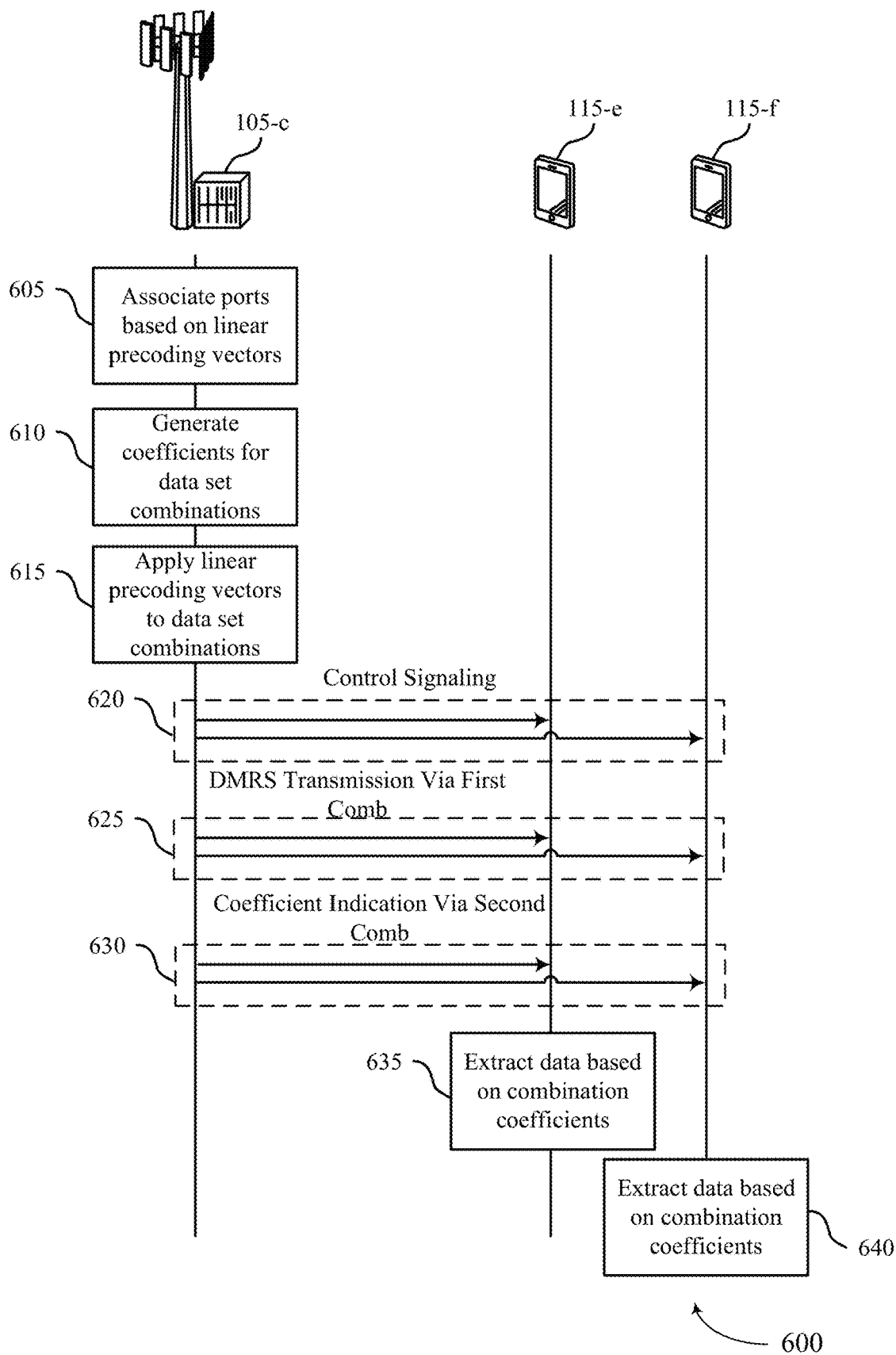
FIG. 6 illustrates an example of a process flow that supports channel estimation and demodulation procedures for non-linear multi-user multiple-input multiple-output precoding in accordance with aspects of the present disclosure.

FIG. 6 illustrates an example of a process flow 600 that supports channel estimation and demodulation procedures for non-linear MU-MIMO precoding in accordance with aspects of the present disclosure. The process flow 600 may implement aspects of wireless communications system 100, or may be implemented by aspects of the wireless communications system 100. For example, the process flow 600 may illustrate operations between a base station 105-*c*, a UE 115-*e*, and a UE 115-*f*, which may be examples of corresponding devices described herein. In the following description of the process flow 600, the operations between the base station 105-*c*, the UE 115-*e*, and the UE 115-*f* may be transmitted in a different order than the example order shown, or the operations performed by the base station 105-*c*, the UE 115-*e*, and the UE 115-*f* may be performed in different orders or at different times. Some operations may also be omitted from the process flow 600, and other operations may be added to the process flow 600.

At 605, the base station 105-*c* may associate a first port with a set of antenna elements of an antenna array and a second port with of the set of antenna elements of the antenna array. In some examples, the first port may be based on a first linear precoding vector and may have a first phase, and the second port may be based on a second linear precoding vector and a phase shift such that the second port may have a second phase that is coherent with (e.g., constructively interferes with) the first phase. The linear precoding vectors may be calculated from an LQ decomposition of a propagation channel (e.g., an MU-MIMO channel) to create a precoded channel.

In some examples, the base station 105-*c* may use a component constellation of a first data set (e.g., $u_1$) and a component constellation of a second data set (e.g., $u_2$) to communicate data to the UE 115-*e* and the UE 115-*f*, respectively. At 610, the base station 105-*c* may generate, based on one or more channel metrics, a first set of coefficients indicating a first combination of the first data set and the second data set and a second set of coefficients indicating a second combination of the first data set and the second data set. For example, the first and second sets of coefficients (e.g., $a_{ij}$) may be in a linear transformation matrix, which the base station 105-*c* may apply to the component constellations of the first and second data sets (e.g., $u_1$ and $u_2$), which may result in a linear combination of contributions from each component constellation to each UE 115. In some cases, the base station 105-*c* may generate the coefficients by applying a neural network whose inputs may be the one or more channel metrics.

In some examples, the base station 105-*c* may adjust the component constellation of the second data set based on a first data set. For example, the base station 105-*c* may use a particular constellation point from the component constellation of the first data set to transmit a particular message to the UE 115-*e*. Based on using the particular constellation point for the transmission to the UE 115-*e*, the base station 105-*c* may use (e.g., adjust) a particular constellation point of a particular component constellation of the second data set to transmit a particular message to the UE 115-*f*.

At 615, the base station 105-*c* may apply the first linear precoding vector to a first input that includes the first combination of the first data set for the UE 115-*e* and the second data set for the UE 115-*f*, and the base station 105-*c* may apply the second linear precoding vector to a second input that includes the second combination of the first data set and the second data set. The first input and the second input may be the resulting linear combinations of contributions based on applying the coefficients to the component constellations of the first and second data sets. The first and second combinations may be different. In some examples, the base station 105-*c* may apply the linear precoding to the first input and the second input to form a precoded channel (e.g., a two-by-two spatially-causal channel) for transmissions to the UE 115-*e* and the UE 115-*f*.

At 620, the base station 105-*c* may transmit, to the UE 115-*e* and the UE 115-*f*, control signaling indicating that the first linear precoding vector is applied to the first combination of the first data set for the UE 115-*e* and the second data set for the UE 115-*f* and the second linear precoding vector is applied to the second combination of the first data set and the second data set. In some examples, the base station 105-*c* may transmit, with the control signaling, an indication that the UE 115-*e* is associated with the first data set and the UE 115-*f* is associated with the second data set. In some examples, the control signaling may be transmitted via DCI.

At 625, the base station 105-*c* may transmit a first DMRS associated with the first port and a second DMRS associated with the second port using a first comb to the UEs 115. In some examples, at 625 the base station 105-*c* may additionally transmit the first linear combination of the first data set and the second data set and the second linear combination of the first data set and the second data set over the first and second ports, for example using PDSCH resource elements. For example, the base station 105-*c* may transmit the first linear combination on a first portion of the precoded channel generated by applying the first linear precoding vector to a propagation channel, where the propagation channel may be a two-by-Nt propagation channel matrix (e.g., where Nt may represent a number of physical antennas associated with the channel), and the base station 105-*c* may transmit the second combination on a second portion of the precoded channel generated by applying the second linear precoding vector to a propagation channel, where the propagation channel may be the two-by-Nt propagation channel matrix.

At 630, the base station 105-*c* may transmit an indication of the combination coefficients generated at 610 to the UEs 115 via a second comb. As described herein, the UE 115-*e* and the UE 115-*f* may decode the data transmitted at 625 if the UE 115-*e* and the UE 115-*f* are aware of the combination coefficients $a_{1,1}$ and $a_{2,2}$. In some examples, the base station 105-*c* may transmit an indication of the combination coefficient $a_{1,1}$ via an in-phase component of a DMRS associated with a third port at the base station and the base station 105-*c* may transmit an indication of the combination coefficient $a_{2,2}$ via a quadrature component of the same DMRS associated with the third port. In some examples, the base station 105-*c* may transmit an indication of the combination coefficient $a_{1,1}$ via a DMRS associated with a third port at the base station and the base station 105-*c* may transmit an indication of the combination coefficient $a_{2,2}$ via a DMRS associated with a fourth port at the base station. In some examples, the control signaling transmitted at 620 may indicate to the UEs 115 which DMRSs (e.g., the DMRS associated with the first port, the DMRS associated with the second port, the DMRS associated with the third port, and/or the DMRS associated with the fourth port) to use to estimate the combination coefficients $a_{1,1}$ and $a_{2,2}$ and/or to use to estimate $l_{1,1}$, $l_{2,1}$, and $e^{jphase(l_{2,1})}l_{2,2}$. In some examples, the control signaling transmitted at 620 may indicate to the UEs 115 a frequency granularity for estimating the linear combination coefficients $a_{1,1}$ and $a_{2,2}$, for example to enable frequency domain averaging for the UEs 115 to estimate linear combination coefficients (e.g., 2 resource elements, 4 resource elements, 6 resource elements, etc.).

At 635, the UE 115-*e* may compute the coefficient $a_{1,2}$ (e.g., by $a_{1,2} = \sqrt{1-a_{1,1}^2}$). The UE 115-*e* may estimate $l_{1,1}$ based on the received DMRS associated with the first port. The UE 115-*e* may extract the first data set from the data transmission using $l_{1,1}$ and the combination coefficients $a_{1,1}$ and $a_{1,2}$. For example, the signal of the data transmission received by the UE 115-*e* may be given by $l_{1,1}(a_{1,1}u_1 + a_{1,2}u_2)$, and accordingly the UE 115-*e* may extract $u_1$, which may be associated with the first data set for the UE 115-*e*.

At 640, the UE 115-*f* may compute the combination coefficients $a_{1,2}$ and $a_{2,1}$ (e.g., by $a_{1,2} = \sqrt{1-a_{1,1}^2}$ and $a_{2,1} = \sqrt{1-a_{2,2}^2}$). The UE 115-*f* may estimate $l_{2,1}$ based on the received DMRS associated with port 1. The UE 115-*f* may estimate $e^{jphase(l_{2,1})}l_{2,2}$ based on the received DMRS associated with port 2. The UE 115-*f* may extract the second data set from the data transmission using $e^{jphase(l_{2,1})}1_{2,2}$, and the combination coefficients $a_{11}$, $a_{12}$, $a_{21}$, and $a_{22}$. For example, the signal of the data transmission received by the UE 115-*f* may be given by $e^{jphase(l_{2,1})}1_{2,2}[\varphi_1 u_1 + \varphi_2 u_2]$, where $$\varphi_1 = \frac{l_{2,1}}{e^{jphase(l_{2,1})}l_{2,2}}\alpha_{1,1} + \alpha_{2,1} \text{ and } \varphi_2 = \frac{l_{2,1}}{e^{jphase(l_{2,1})}l_{2,2}}\alpha_{1,2} + \alpha_{2,2}.$$

Accordingly the UE 115-*f* may extract $u_2$, which may be associated with the second data set for the UE 115-*f*.

Figure 7:
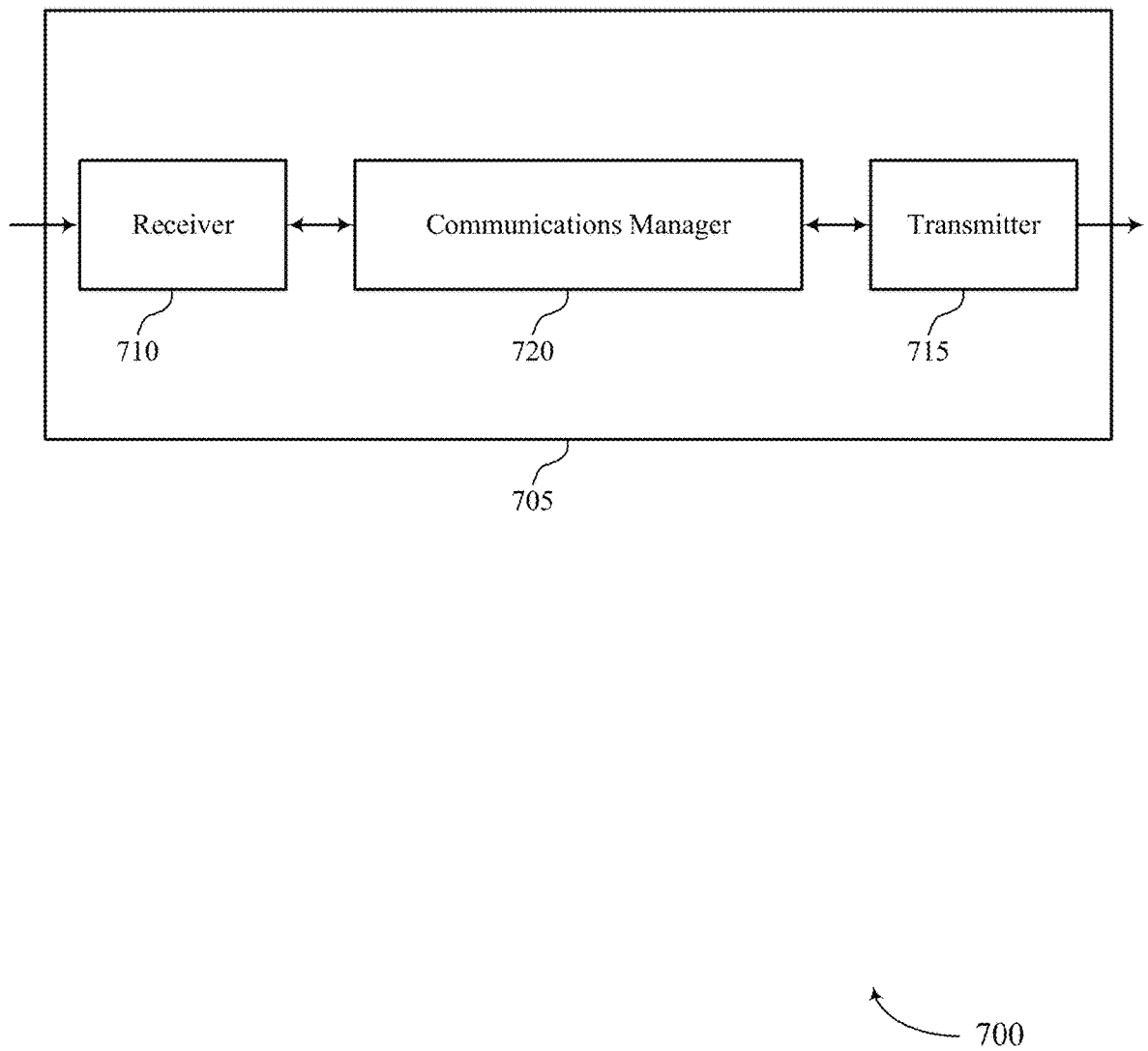
FIGS. 7 and 8 show block diagrams of devices that support channel estimation and demodulation procedures for non-linear multi-user multiple-input multiple-output precoding in accordance with aspects of the present disclosure.

FIG. 7 shows a block diagram 700 of a device 705 that supports channel estimation and demodulation procedure for non-linear MU-MIMO precoding in accordance with aspects of the present disclosure. The device 705 may be an example of aspects of a base station 105 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to channel estimation and demodulation procedure for non-linear MU-MIMO precoding). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to channel estimation and demodulation procedure for non-linear MU-MIMO precoding). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of channel estimation and demodulation procedure for non-linear precoding as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

For example, the communications manager 720 may be configured as or otherwise support a means for associating a first port with a set of multiple antenna elements of an antenna array, the first port based on a first linear precoding vector and having a first phase. The communications manager 720 may be configured as or otherwise support a means for associating a second port with the set of multiple antenna elements of the antenna array, the second port based on a second linear precoding vector and a phase shift such that the second port has a second phase that is coherent with the first phase. The communications manager 720 may be configured as or otherwise support a means for transmitting, to a first UE and a second UE, control signaling indicating that the first linear precoding vector is applied to a first combination of data sets and that the second linear precoding vector is applied to a second combination of data sets, where the first combination is of a first data set for the first UE and a second data set for the second UE, and the second combination is also of the first data set for the first UE and the second data set for the second UE but is different from the first combination. The communications manager 720 may be configured as or otherwise support a means for transmitting a first demodulation reference signal associated with the first port. The communications manager 720 may be configured as or otherwise support a means for transmitting a second demodulation reference signal associated with the second port. The communications manager 720 may be configured as or otherwise support a means for transmitting a third demodulation reference signal associated with a third port at the base station, where the third demodulation reference signal includes information for extracting the first data set for the first UE and the second data set for the second UE.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for non-linear precoding for MU-MIMO communications, which may improve the reliability of data reception for transmissions to two UEs.

Figure 8:
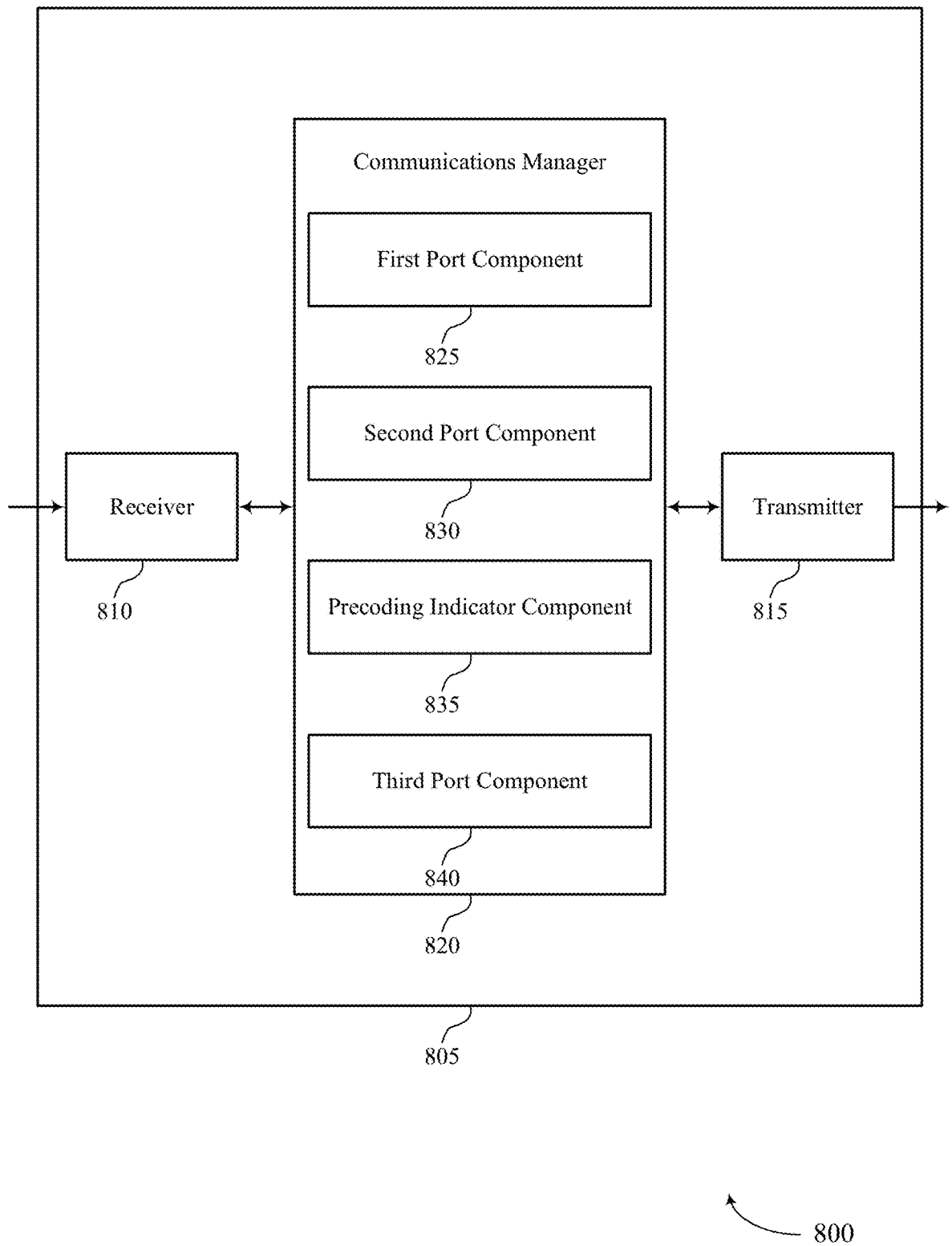

FIG. 8 shows a block diagram 800 of a device 805 that supports channel estimation and demodulation procedure for non-linear MU-MIMO precoding in accordance with aspects of the present disclosure. The device 805 may be an example of aspects of a device 705 or a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to channel estimation and demodulation procedure for non-linear MU-MIMO precoding). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to channel estimation and demodulation procedure for non-linear MU-MIMO precoding). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of channel estimation and demodulation procedure for non-linear MU-MIMO precoding as described herein. For example, the communications manager 820 may include a first port component 825, a second port component 830, a precoding indicator component 835, a third port component 840, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The first port component 825 may be configured as or otherwise support a means for associating a first port with a set of multiple antenna elements of an antenna array, the first port based on a first linear precoding vector and having a first phase. The second port component 830 may be configured as or otherwise support a means for associating a second port with the set of multiple antenna elements of the antenna array, the second port based on a second linear precoding vector and a phase shift such that the second port has a second phase that is coherent with the first phase. The precoding indicator component 835 may be configured as or otherwise support a means for transmitting, to a first UE and a second UE, control signaling indicating that the first linear precoding vector is applied to a first combination of data sets and that the second linear precoding vector is applied to a second combination of data sets, where the first combination is of a first data set for the first UE and a second data set for the second UE, and the second combination is also of the first data set for the first UE and the second data set for the second UE but is different from the first combination. The first port component 825 may be configured as or otherwise support a means for transmitting a first demodulation reference signal associated with the first port. The second port component 830 may be configured as or otherwise support a means for transmitting a second demodulation reference signal associated with the second port. The third port component 840 may be configured as or otherwise support a means for transmitting a third demodulation reference signal associated with a third port at the base station, where the third demodulation reference signal includes information for extracting the first data set for the first UE and the second data set for the second UE.

Figure 9:
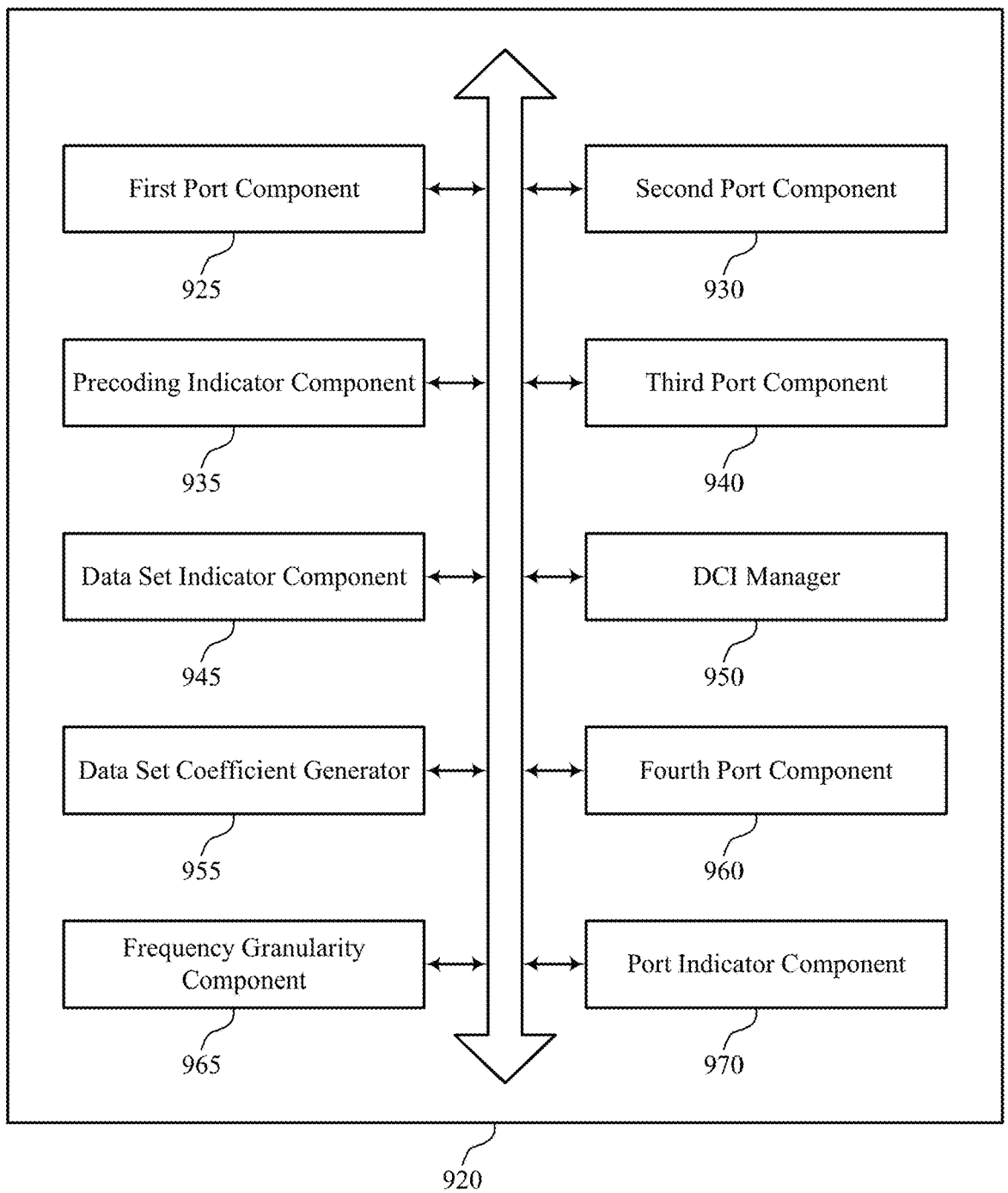
FIG. 9 shows a block diagram of a communications manager that supports channel estimation and demodulation procedures for non-linear multi-user multiple-input multiple-output precoding in accordance with aspects of the present disclosure.

FIG. 9 shows a block diagram 900 of a communications manager 920 that supports channel estimation and demodulation procedure for non-linear MU-MIMO precoding in accordance with aspects of the present disclosure. The communications manager 920 may be an example of aspects of a communications manager 720, a communications manager 820, or both, as described herein. The communications manager 920, or various components thereof, may be an example of means for performing various aspects of channel estimation and demodulation procedure for non-linear MU-MIMO precoding as described herein. For example, the communications manager 920 may include a first port component 925, a second port component 930, a precoding indicator component 935, a third port component 940, a data set indicator component 945, a DCI manager 950, a data set coefficient generator 955, a fourth port component 960, a frequency granularity component 965, a port indicator component 970, or any combination thereof. Each of these components may communicate, directly or indirectly, with one another (e.g., via one or more buses).

The first port component 925 may be configured as or otherwise support a means for associating a first port with a set of multiple antenna elements of an antenna array, the first port based on a first linear precoding vector and having a first phase. The second port component 930 may be configured as or otherwise support a means for associating a second port with the set of multiple antenna elements of the antenna array, the second port based on a second linear precoding vector and a phase shift such that the second port has a second phase that is coherent with the first phase. The precoding indicator component 935 may be configured as or otherwise support a means for transmitting, to a first UE and a second UE, control signaling indicating that the first linear precoding vector is applied to a first combination of data sets and that the second linear precoding vector is applied to a second combination of data sets, where the first combination is of a first data set for the first UE and a second data set for the second UE, and the second combination is also of the first data set for the first UE and the second data set for the second UE but is different from the first combination. In some examples, the first port component 925 may be configured as or otherwise support a means for transmitting a first demodulation reference signal associated with the first port. In some examples, the second port component 930 may be configured as or otherwise support a means for transmitting a second demodulation reference signal associated with the second port. The third port component 940 may be configured as or otherwise support a means for transmitting a third demodulation reference signal associated with a third port at the base station, where the third demodulation reference signal includes information for extracting the first data set for the first UE and the second data set for the second UE.

In some examples, the data set indicator component 945 may be configured as or otherwise support a means for transmitting, with the control signaling, an indication that the first UE is associated with the first data set and that the second UE is associated with the second data set.

In some examples, the DCI manager 950 may be configured as or otherwise support a means for transmitting the control signaling via a downlink control information signal.

In some examples, the data set coefficient generator 955 may be configured as or otherwise support a means for generating, based on one or more channel metrics, a first set of coefficients indicative of the first combination of data sets. In some examples, the data set coefficient generator 955 may be configured as or otherwise support a means for generating, based on the one or more channel metrics, a second set of coefficients indicative of the second combination of data sets.

In some examples, the third port component 940 may be configured as or otherwise support a means for transmitting, with the third demodulation reference signal, a first indication of the first set of coefficients and a second indication of the second set of coefficients.

In some examples, to support transmitting the first indication and the second indication, the third port component 940 may be configured as or otherwise support a means for transmitting the first indication via an in-phase component of the third demodulation reference signal. In some examples, to support transmitting the first indication and the second indication, the third port component 940 may be configured as or otherwise support a means for transmitting the second indication via a quadrature component of the third demodulation reference signal.

In some examples, the port indicator component 970 may be configured as or otherwise support a means for transmitting, with the control signaling, a third indication to use at least one of the first demodulation reference signal, the second demodulation reference signal, or the third demodulation reference signal for estimating the first set of coefficients and the second set of coefficients.

In some examples, the third port component 940 may be configured as or otherwise support a means for transmitting, with the third demodulation reference signal, to the first UE and the second UE, a first indication of the first set of coefficients. In some examples, the fourth port component 960 may be configured as or otherwise support a means for transmitting, with a fourth demodulation reference signal associated with a fourth port, to the first UE and the second UE, a second indication of the second set of coefficients.

In some examples, the port indicator component 970 may be configured as or otherwise support a means for transmitting, with the control signaling, a third indication to use at least one of the first demodulation reference signal, the second demodulation reference signal, the third demodulation reference signal, or the fourth demodulation reference signal for estimating the first set of coefficients and the second set of coefficients.

In some examples, the frequency granularity component 965 may be configured as or otherwise support a means for transmitting, with the control signaling, an indication of a frequency granularity for estimating the first set of coefficients and the second set of coefficients.

Figure 10:
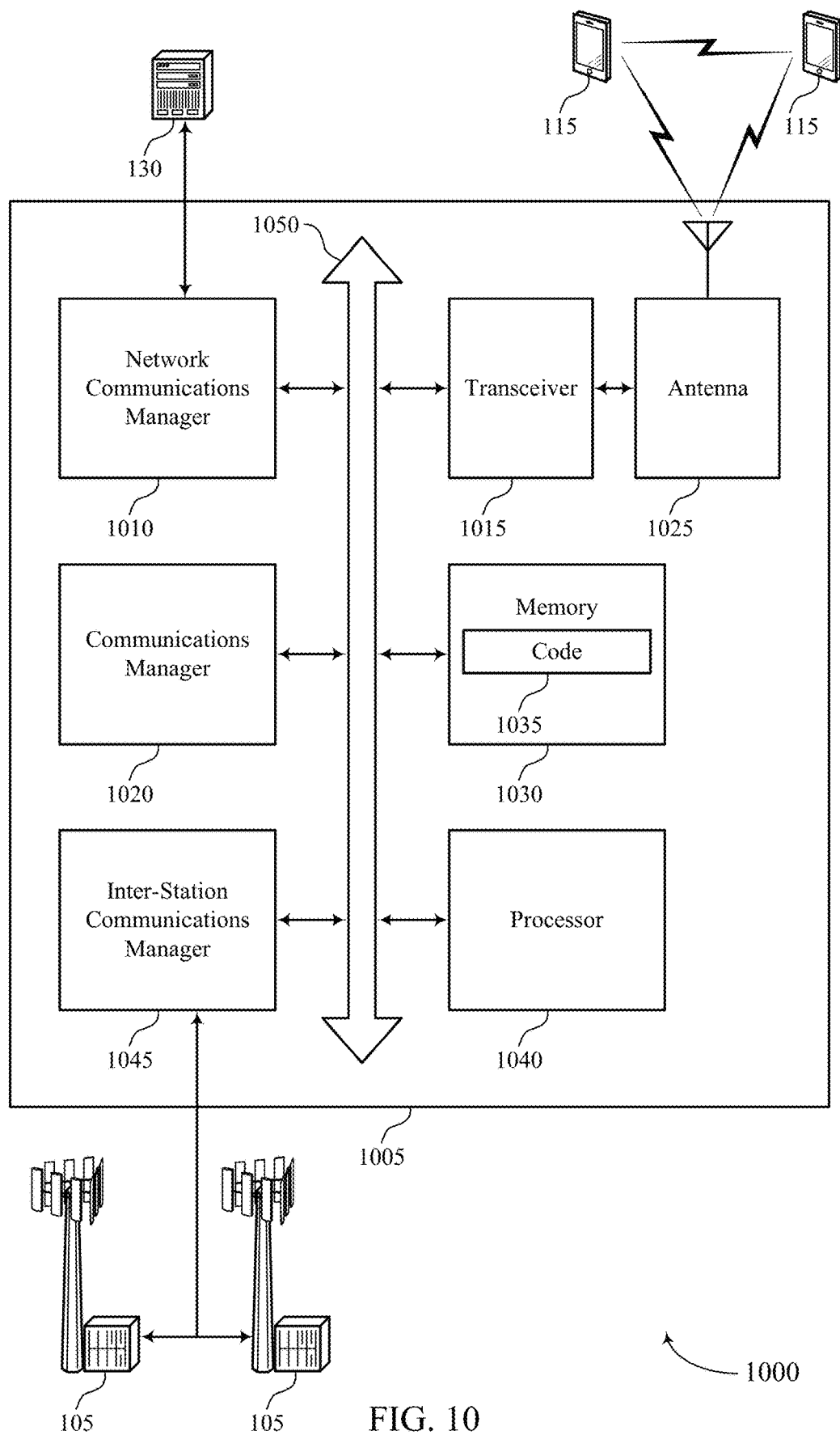
FIG. 10 shows a diagram of a system including a device that supports channel estimation and demodulation procedures for non-linear multi-user multiple-input multiple-output precoding in accordance with aspects of the present disclosure.

FIG. 10 shows a diagram of a system 1000 including a device 1005 that supports channel estimation and demodulation procedure for non-linear MU-MIMO precoding in accordance with aspects of the present disclosure. The device 1005 may be an example of or include the components of a device 705, a device 805, or a base station 105 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, a network communications manager 1010, a transceiver 1015, an antenna 1025, a memory 1030, code 1035, a processor 1040, and an inter-station communications manager 1045. These components may be in electronic communication or otherwise coupled (e.g., operatively, communicatively, functionally, electronically, electrically) via one or more buses (e.g., a bus 1050).

The network communications manager 1010 may manage communications with a core network 130 (e.g., via one or more wired backhaul links). For example, the network communications manager 1010 may manage the transfer of data communications for client devices, such as one or more UEs 115.

In some cases, the device 1005 may include a single antenna 1025. However, in some other cases the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting channel estimation and demodulation procedure for non-linear MU-MIMO precoding). For example, the device 1005 or a component of the device 1005 may include a processor 1040 and memory 1030 coupled to the processor 1040, the processor 1040 and memory 1030 configured to perform various functions described herein.

The inter-station communications manager 1045 may manage communications with other base stations 105, and may include a controller or scheduler for controlling communications with UEs 115 in cooperation with other base stations 105. For example, the inter-station communications manager 1045 may coordinate scheduling for transmissions to UEs 115 for various interference mitigation techniques such as beamforming or joint transmission. In some examples, the inter-station communications manager 1045 may provide an X2 interface within an LTE/LTE-A wireless communications network technology to provide communication between base stations 105.

For example, the communications manager 1020 may be configured as or otherwise support a means for associating a first port with a set of multiple antenna elements of an antenna array, the first port based on a first linear precoding vector and having a first phase. The communications manager 1020 may be configured as or otherwise support a means for associating a second port with the set of multiple antenna elements of the antenna array, the second port based on a second linear precoding vector and a phase shift such that the second port has a second phase that is coherent with the first phase. The communications manager 1020 may be configured as or otherwise support a means for transmitting, to a first UE and a second UE, control signaling indicating that the first linear precoding vector is applied to a first combination of data sets and that the second linear precoding vector is applied to a second combination of data sets, where the first combination is of a first data set for the first UE and a second data set for the second UE, and the second combination is also of the first data set for the first UE and the second data set for the second UE but is different from the first combination. The communications manager 1020 may be configured as or otherwise support a means for transmitting a first demodulation reference signal associated with the first port. The communications manager 1020 may be configured as or otherwise support a means for transmitting a second demodulation reference signal associated with the second port. The communications manager 1020 may be configured as or otherwise support a means for transmitting a third demodulation reference signal associated with a third port at the base station, where the third demodulation reference signal includes information for extracting the first data set for the first UE and the second data set for the second UE.

By including or configuring the communications manager 1020 in accordance with examples as described herein, the device 1005 may support techniques for support techniques for non-linear precoding for MU-MIMO communications, which may improve the reliability of data reception for transmissions to two UEs.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of channel estimation and demodulation procedure for non-linear MU-MIMO precoding as described herein, or the processor 1040 and the memory 1030 may be otherwise configured to perform or support such operations.

Figure 11:
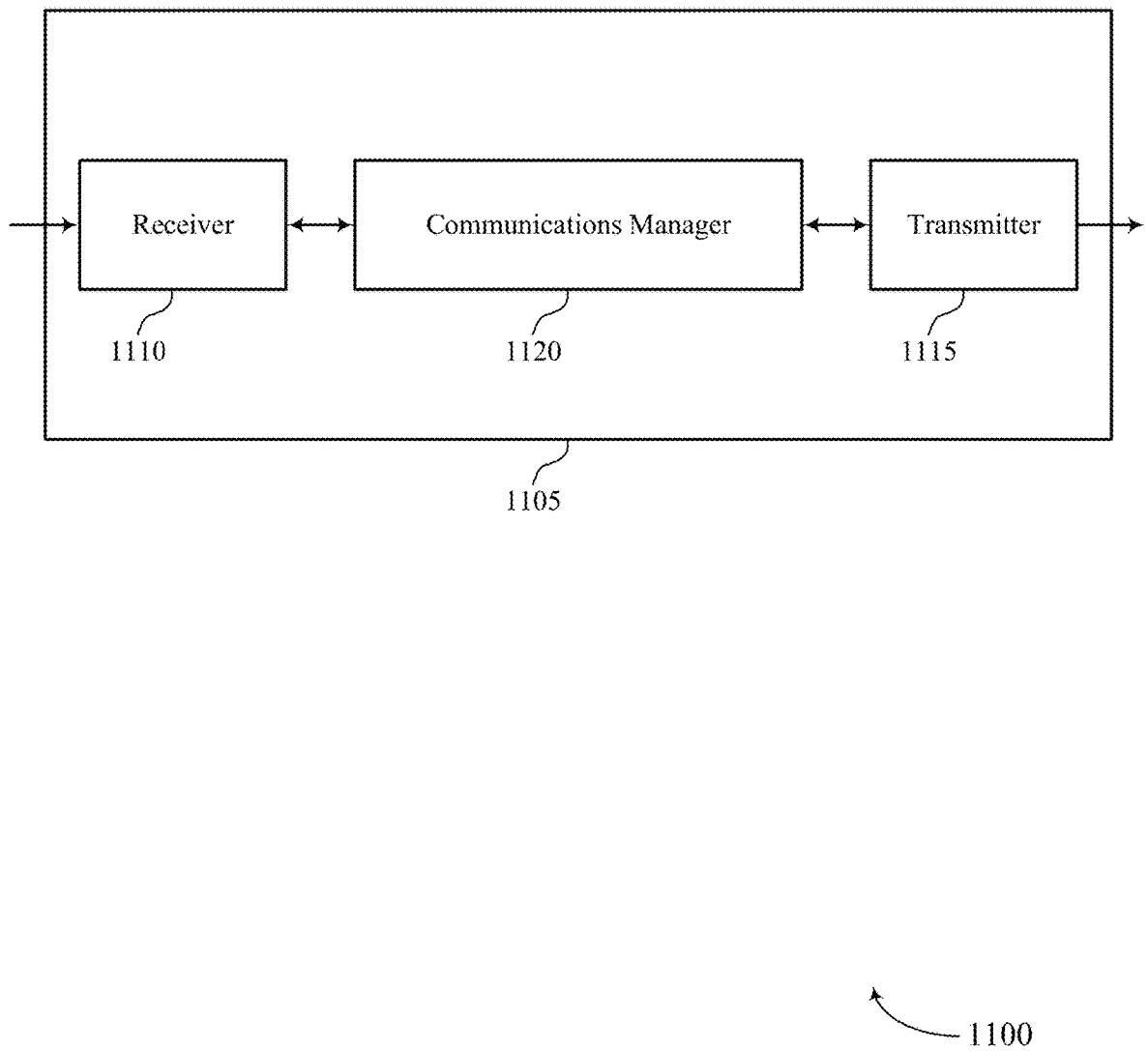
FIGS. 11 and 12 show block diagrams of devices that support channel estimation and demodulation procedures for non-linear multi-user multiple-input multiple-output precoding in accordance with aspects of the present disclosure.

FIG. 11 shows a block diagram 1100 of a device 1105 that supports channel estimation and demodulation procedure for non-linear MU-MIMO precoding in accordance with aspects of the present disclosure. The device 1105 may be an example of aspects of a UE 115 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to channel estimation and demodulation procedure for non-linear MU-MIMO precoding). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to channel estimation and demodulation procedure for non-linear MU-MIMO precoding). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of channel estimation and demodulation procedure for non-linear MU-MIMO precoding as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

For example, the communications manager 1120 may be configured as or otherwise support a means for receiving, from a base station, control signaling indicating that a first linear precoding vector is applied to a first combination of data sets and that a second linear precoding vector is applied to a second combination of data sets, where the first combination is of a first data set for the first UE and a second data set for a second UE, and the second combination is also of the first data set for the first UE and the second data set for the second UE but is different from the first combination. The communications manager 1120 may be configured as or otherwise support a means for receiving, from the base station via a first comb associated with a first port and a second port, a first demodulation reference signal associated with the first port and a second demodulation reference signal associated with the second port. The communications manager 1120 may be configured as or otherwise support a means for receiving, from the base station via a second comb associated with at least a third demodulation reference signal associated with a third port, a message including a first indication of a first set of coefficients indicative of the first combination of data sets and a second indication of a second set of coefficients indicative of the second combination of data sets. In some examples, to, the communications manager 1120 may be configured as or otherwise support a means for a first indication of a first set of coefficients indicative of the first combination of data sets and a second indication of a second set of coefficients indicative of the second combination of data sets.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for non-linear precoding for MU-MIMO communications, which may improve the reliability of data reception for transmissions to two UEs.

Figure 12:
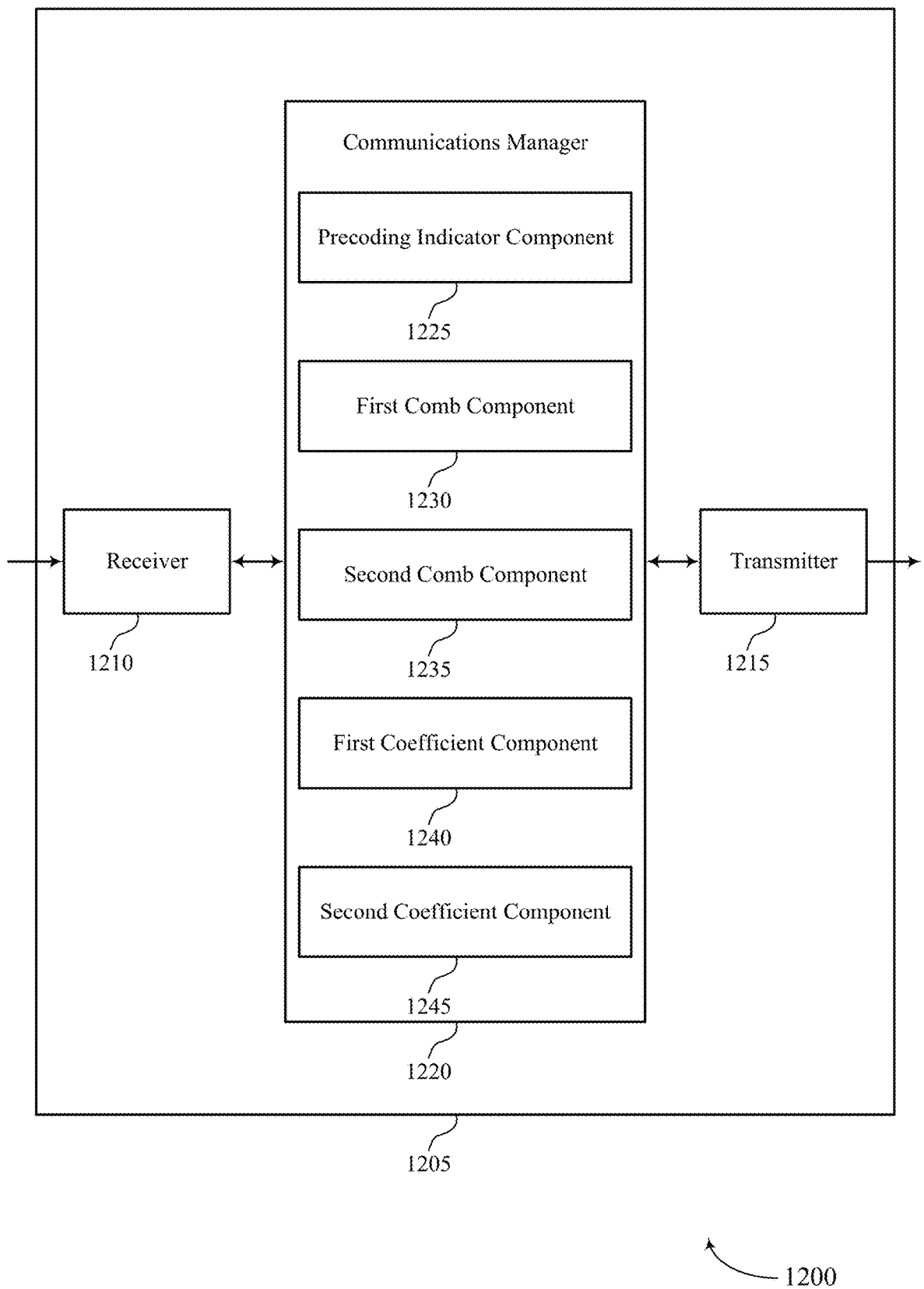

FIG. 12 shows a block diagram 1200 of a device 1205 that supports channel estimation and demodulation procedure for non-linear MU-MIMO precoding in accordance with aspects of the present disclosure. The device 1205 may be an example of aspects of a device 1105 or a UE 115 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to channel estimation and demodulation procedure for non-linear MU-MIMO precoding). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to channel estimation and demodulation procedure for non-linear MU-MIMO precoding). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of channel estimation and demodulation procedure for non-linear MU-MIMO precoding as described herein. For example, the communications manager 1220 may include a precoding indicator component 1225, a first comb component 1230, a second comb component 1235, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The precoding indicator component 1225 may be configured as or otherwise support a means for receiving, from a base station, control signaling indicating that a first linear precoding vector is applied to a first combination of data sets and that a second linear precoding vector is applied to a second combination of data sets, where the first combination is of a first data set for the first UE and a second data set for a second UE, and the second combination is also of the first data set for the first UE and the second data set for the second UE but is different from the first combination. The first comb component 1230 may be configured as or otherwise support a means for receiving, from the base station via a first comb associated with a first port and a second port, a first demodulation reference signal associated with the first port and a second demodulation reference signal associated with the second port. The second comb component 1235 may be configured as or otherwise support a means for receiving, from the base station via a second comb associated with at least a third demodulation reference signal associated with a third port, a message including a first indication of a first set of coefficients indicative of the first combination of data sets and a second indication of a second set of coefficients indicative of the second combination of data sets. In some examples, to, the first coefficient component 1240 may be configured as or otherwise support a means for a first indication of a first set of coefficients indicative of the first combination of data sets and the second coefficient component 1245 may be configured as or otherwise support a means for a second indication of a second set of coefficients indicative of the second combination of data sets.

Figure 13:
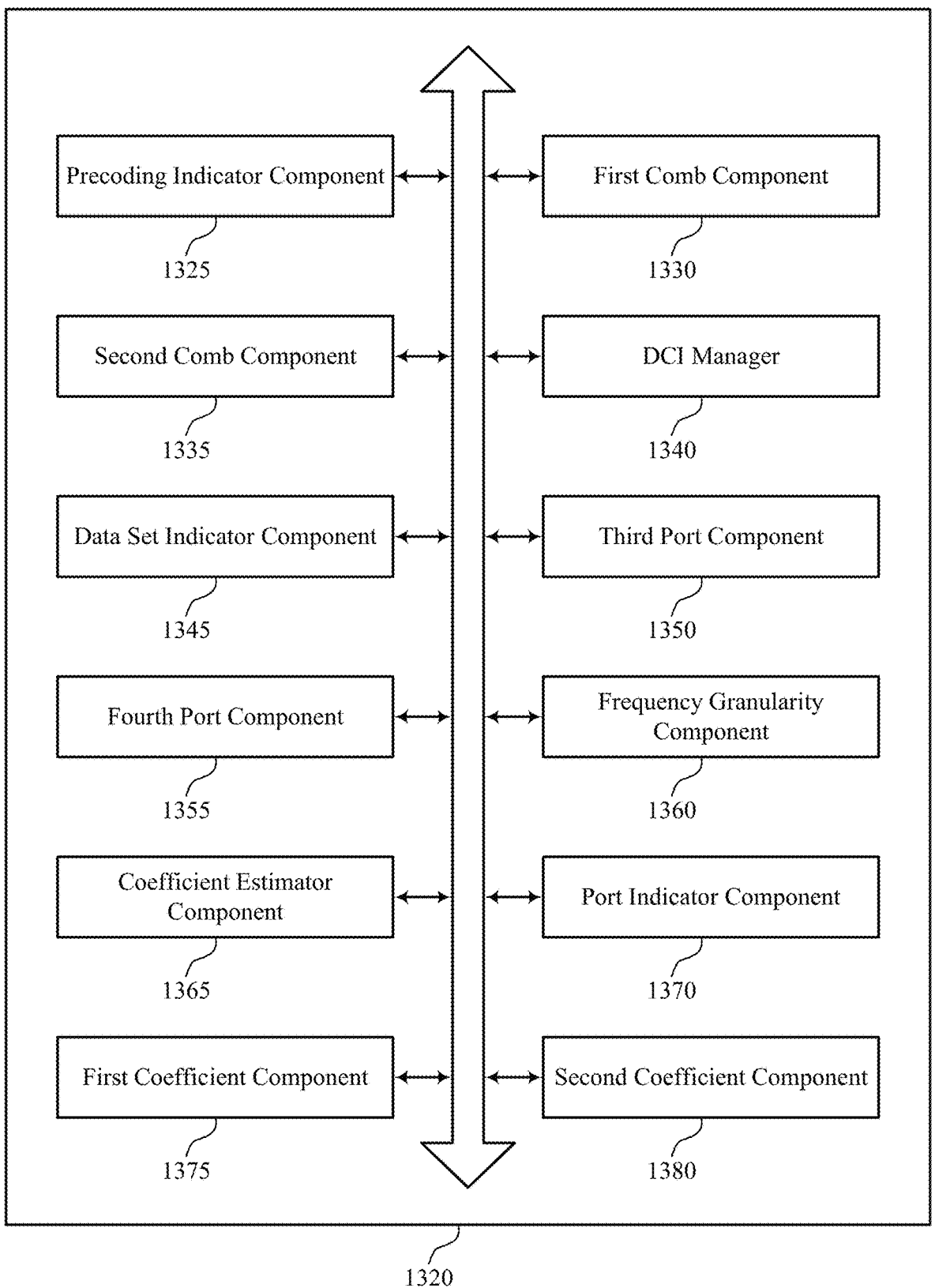
FIG. 13 shows a block diagram of a communications manager that supports channel estimation and demodulation procedures for non-linear multi-user multiple-input multiple-output precoding in accordance with aspects of the present disclosure.

FIG. 13 shows a block diagram 1300 of a communications manager 1320 that supports channel estimation and demodulation procedure for non-linear MU-MIMO precoding in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of channel estimation and demodulation procedure for non-linear MU-MIMO precoding as described herein. For example, the communications manager 1320 may include a precoding indicator component 1325, a first comb component 1330, a second comb component 1335, a DCI manager 1340, a data set indicator component 1345, a third port component 1350, a fourth port component 1355, a frequency granularity component 1360, a coefficient estimator component 1365, a port indicator component 1370, a first coefficient component 1375, a second coefficient component 1380, or any combination thereof. Each of these components may communicate, directly or indirectly, with one another (e.g., via one or more buses).

The precoding indicator component 1325 may be configured as or otherwise support a means for receiving, from a base station, control signaling indicating that a first linear precoding vector is applied to a first combination of data sets and that a second linear precoding vector is applied to a second combination of data sets, where the first combination is of a first data set for the first UE and a second data set for a second UE, and the second combination is also of the first data set for the first UE and the second data set for the second UE but is different from the first combination. The first comb component 1330 may be configured as or otherwise support a means for receiving, from the base station via a first comb associated with a first port and a second port, a first demodulation reference signal associated with the first port and a second demodulation reference signal associated with the second port. The second comb component 1335 may be configured as or otherwise support a means for receiving, from the base station via a second comb associated with at least a third demodulation reference signal associated with a third port, a message including a first indication of a first set of coefficients indicative of the first combination of data sets and a second indication of a second set of coefficients indicative of the second combination of data sets. In some examples, the first coefficient component 1375 may be configured as or otherwise support a means for a first indication of a first set of coefficients indicative of the first combination of data sets and the second coefficient component 1380 may be configured as or otherwise support a means for a second indication of a second set of coefficients indicative of the second combination of data sets.

In some examples, the DCI manager 1340 may be configured as or otherwise support a means for receiving the control signaling via a downlink control information message.

In some examples, the data set indicator component 1345 may be configured as or otherwise support a means for receiving, with the control signaling, a third indication that the first UE is associated with the first data set and the second UE is associated with the second data set.

In some examples, to support receiving the message, the third port component 1350 may be configured as or otherwise support a means for receiving the first indication as an in-phase component of the third demodulation reference signal. In some examples, to support receiving the message, the third port component 1350 may be configured as or otherwise support a means for receiving the second indication via a quadrature phase component of the third demodulation reference signal.

In some examples, the port indicator component 1370 may be configured as or otherwise support a means for receiving, with the control signaling, a third indication to use at least one of the first demodulation reference signal, the second demodulation reference signal, or the third demodulation reference signal for estimating the first set of coefficients and the second set of coefficients. In some examples, the coefficient estimator component 1365 may be configured as or otherwise support a means for estimating the first set of coefficients and the second set of coefficients based on the control signaling.

In some examples, to support receiving the message, the third port component 1350 may be configured as or otherwise support a means for receiving, with the third demodulation reference signal, the first indication. In some examples, to support receiving the message, the fourth port component 1355 may be configured as or otherwise support a means for receiving, with a fourth demodulation reference signal associated with a fourth port, the second indication.

In some examples, the port indicator component 1370 may be configured as or otherwise support a means for receiving, with the control signaling, a third indication to use at least one of the first demodulation reference signal, the second demodulation reference signal, the third demodulation reference signal, or the fourth demodulation reference signal for estimating the first set of coefficients and the second set of coefficients. In some examples, the coefficient estimator component 1365 may be configured as or otherwise support a means for estimating the first set of coefficients and the second set of coefficients based on the control signaling.

In some examples, the frequency granularity component 1360 may be configured as or otherwise support a means for receiving, with the control signaling, a third indication of a frequency granularity for estimating the first set of coefficients and the second set of coefficients. In some examples, the coefficient estimator component 1365 may be configured as or otherwise support a means for estimating the first set of coefficients and the second set of coefficients based on the third indication of the frequency granularity, the first indication, and the second indication.

Figure 14:
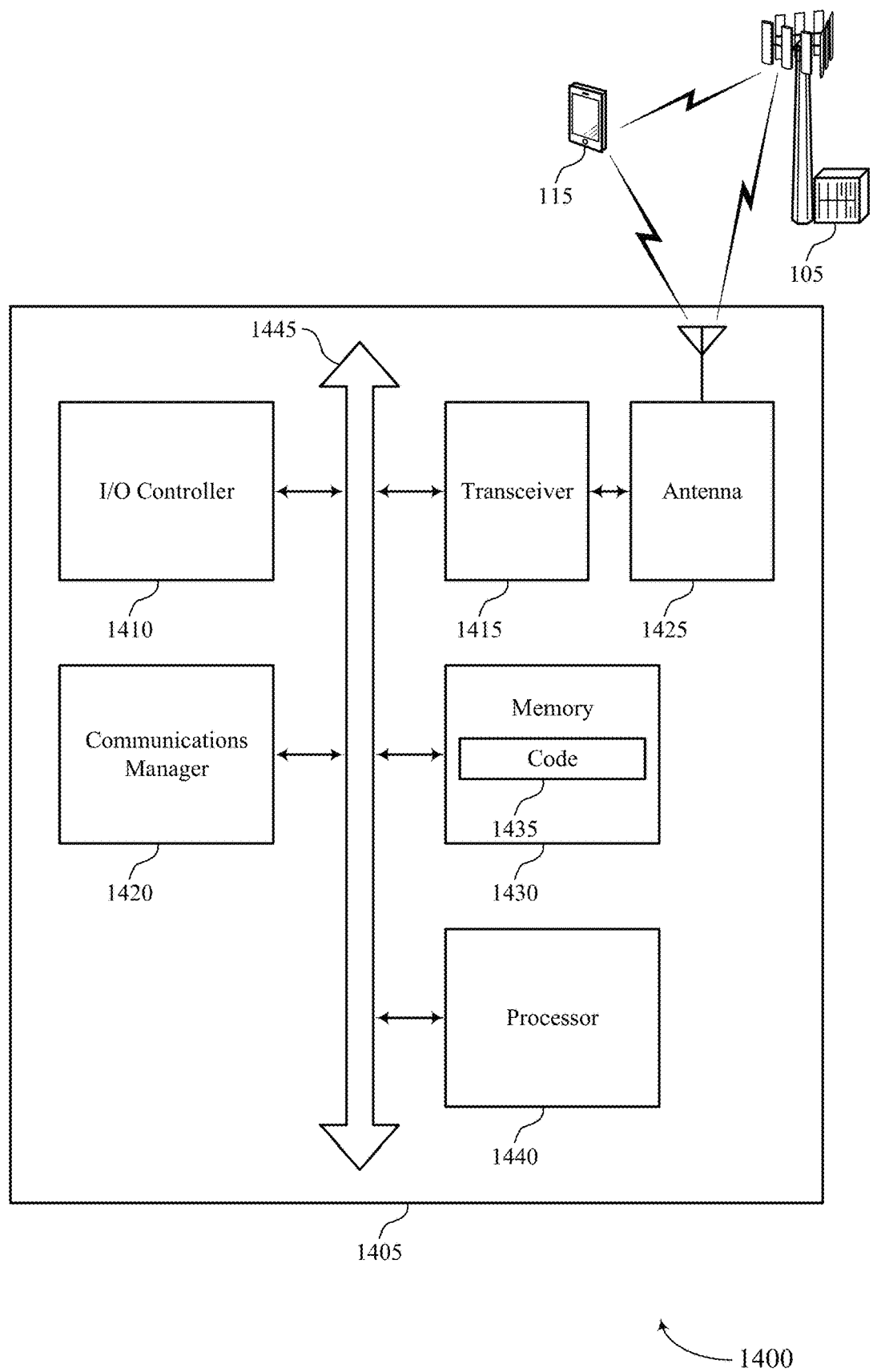
FIG. 14 shows a diagram of a system including a device that supports channel estimation and demodulation procedures for non-linear multi-user multiple-input multiple-output precoding in accordance with aspects of the present disclosure.

FIG. 14 shows a diagram of a system 1400 including a device 1405 that supports channel estimation and demodulation procedure for non-linear MU-MIIVIO precoding in accordance with aspects of the present disclosure. The device 1405 may be an example of or include the components of a device 1105, a device 1205, or a UE 115 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, an input/output (I/O) controller 1410, a transceiver 1415, an antenna 1425, a memory 1430, code 1435, and a processor 1440. These components may be in electronic communication or otherwise coupled (e.g., operatively, communicatively, functionally, electronically, electrically) via one or more buses (e.g., a bus 1445).

The I/O controller 1410 may manage input and output signals for the device 1405. The I/O controller 1410 may also manage peripherals not integrated into the device 1405. In some cases, the I/O controller 1410 may represent a physical connection or port to an external peripheral. In some cases, the I/O controller 1410 may utilize an operating system such as iOS®, ANDROID®, MS-DOS®, MS-WINDOWS®, OS/2®, UNIX®, LINUX®, or another known operating system. Additionally or alternatively, the I/O controller 1410 may represent or interact with a modem, a keyboard, a mouse, a touchscreen, or a similar device. In some cases, the I/O controller 1410 may be implemented as part of a processor, such as the processor 1440. In some cases, a user may interact with the device 1405 via the I/O controller 1410 or via hardware components controlled by the I/O controller 1410.

In some cases, the device 1405 may include a single antenna 1425. However, in some other cases, the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting channel estimation and demodulation procedure for non-linear MU-MIMO precoding). For example, the device 1405 or a component of the device 1405 may include a processor 1440 and memory 1430 coupled to the processor 1440, the processor 1440 and memory 1430 configured to perform various functions described herein.

For example, the communications manager 1420 may be configured as or otherwise support a means for receiving, from a base station, control signaling indicating that a first linear precoding vector is applied to a first combination of data sets and that a second linear precoding vector is applied to a second combination of data sets, where the first combination is of a first data set for the first UE and a second data set for a second UE, and the second combination is also of the first data set for the first UE and the second data set for the second UE but is different from the first combination. The communications manager 1420 may be configured as or otherwise support a means for receiving, from the base station via a first comb associated with a first port and a second port, a first demodulation reference signal associated with the first port and a second demodulation reference signal associated with the second port. The communications manager 1420 may be configured as or otherwise support a means for receiving, from the base station via a second comb associated with at least a third demodulation reference signal associated with a third port, a message including a first indication of a first set of coefficients indicative of the first combination of data sets and a second indication of a second set of coefficients indicative of the second combination of data sets. In some examples, to, the communications manager 1420 may be configured as or otherwise support a means for a first indication of a first set of coefficients indicative of the first combination of data sets and a second indication of a second set of coefficients indicative of the second combination of data sets.

By including or configuring the communications manager 1420 in accordance with examples as described herein, the device 1405 may support techniques for non-linear precoding for MU-MIMO communications, which may improve the reliability of data reception for transmissions to two UEs.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of channel estimation and demodulation procedure for non-linear MU-MIMO precoding as described herein, or the processor 1440 and the memory 1430 may be otherwise configured to perform or support such operations.

Figure 15:
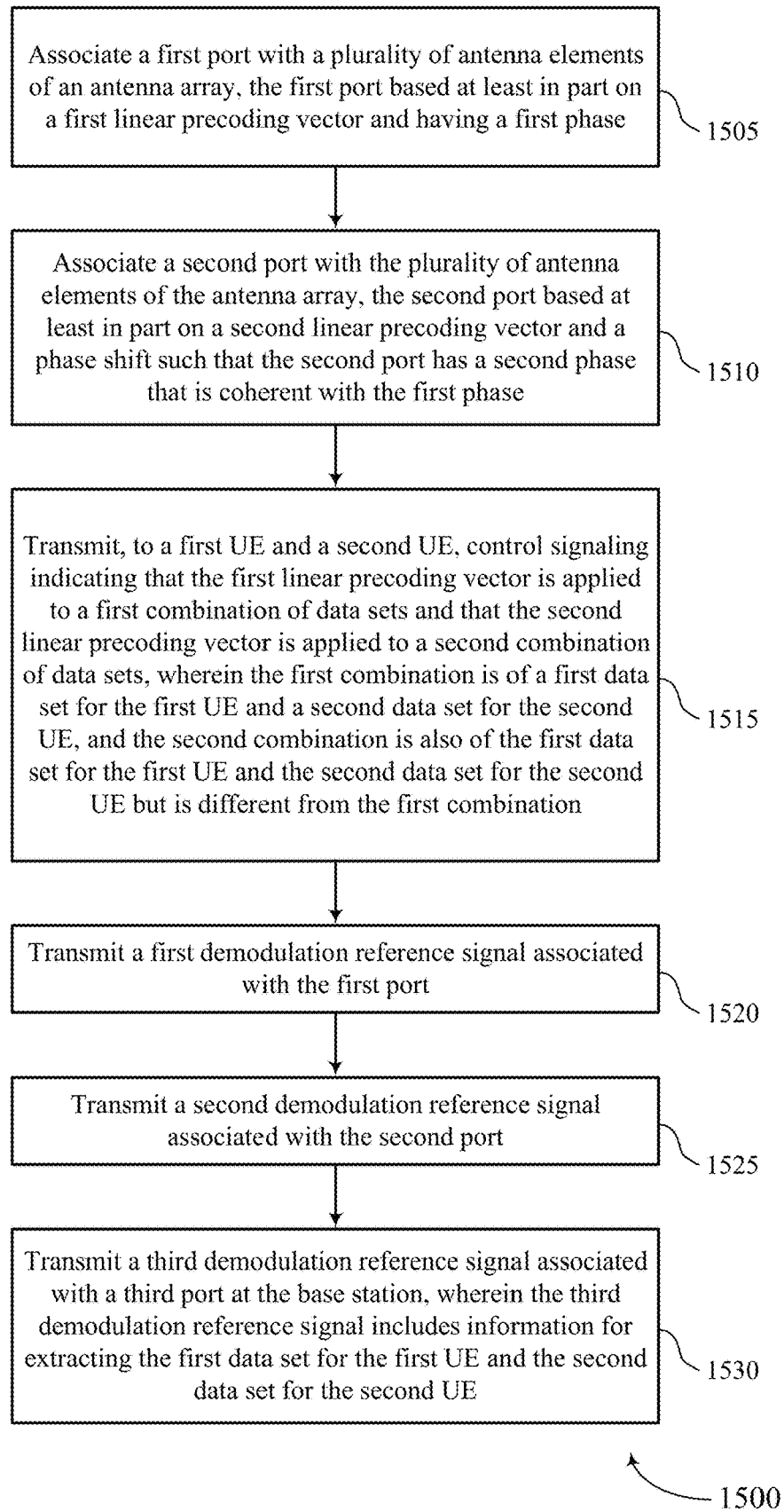
FIGS. 15 through 20 show flowcharts illustrating methods that support channel estimation and demodulation procedures for non-linear multi-user multiple-input multiple-output precoding in accordance with aspects of the present disclosure.

FIG. 15 shows a flowchart illustrating a method 1500 that supports channel estimation and demodulation procedure for non-linear MU-MIMO precoding in accordance with aspects of the present disclosure. The operations of the method 1500 may be implemented by a base station or its components as described herein. For example, the operations of the method 1500 may be performed by a base station 105 as described with reference to FIGS. 1 through 10. In some examples, a base station may execute a set of instructions to control the functional elements of the base station to perform the described functions. Additionally or alternatively, the base station may perform aspects of the described functions using special-purpose hardware.

At 1505, the method may include associating a first port with a set of multiple antenna elements of an antenna array, the first port based on a first linear precoding vector and having a first phase. The operations of 1505 may be performed in accordance with examples as disclosed herein. In some examples, aspects of the operations of 1505 may be performed by a first port component 925 as described with reference to FIG. 9.

At 1510, the method may include associating a second port with the set of multiple antenna elements of the antenna array, the second port based on a second linear precoding vector and a phase shift such that the second port has a second phase that is coherent with the first phase. The operations of 1510 may be performed in accordance with examples as disclosed herein. In some examples, aspects of the operations of 1510 may be performed by a second port component 930 as described with reference to FIG. 9.

At 1515, the method may include transmitting, to a first UE and a second UE, control signaling indicating that the first linear precoding vector is applied to a first combination of data sets and that the second linear precoding vector is applied to a second combination of data sets, where the first combination is of a first data set for the first UE and a second data set for the second UE, and the second combination is also of the first data set for the first UE and the second data set for the second UE but is different from the first combination. The operations of 1515 may be performed in accordance with examples as disclosed herein. In some examples, aspects of the operations of 1515 may be performed by a precoding indicator component 935 as described with reference to FIG. 9.

At 1520, the method may include transmitting a first demodulation reference signal associated with the first port. The operations of 1520 may be performed in accordance with examples as disclosed herein. In some examples, aspects of the operations of 1520 may be performed by a first port component 925 as described with reference to FIG. 9.

At 1525, the method may include transmitting a second demodulation reference signal associated with the second port. The operations of 1525 may be performed in accordance with examples as disclosed herein. In some examples, aspects of the operations of 1525 may be performed by a second port component 930 as described with reference to FIG. 9.

At 1530, the method may include transmitting a third demodulation reference signal associated with a third port at the base station, where the third demodulation reference signal includes information for extracting the first data set for the first UE and the second data set for the second UE. The operations of 1530 may be performed in accordance with examples as disclosed herein. In some examples, aspects of the operations of 1530 may be performed by a third port component 940 as described with reference to FIG. 9.

Figure 16:
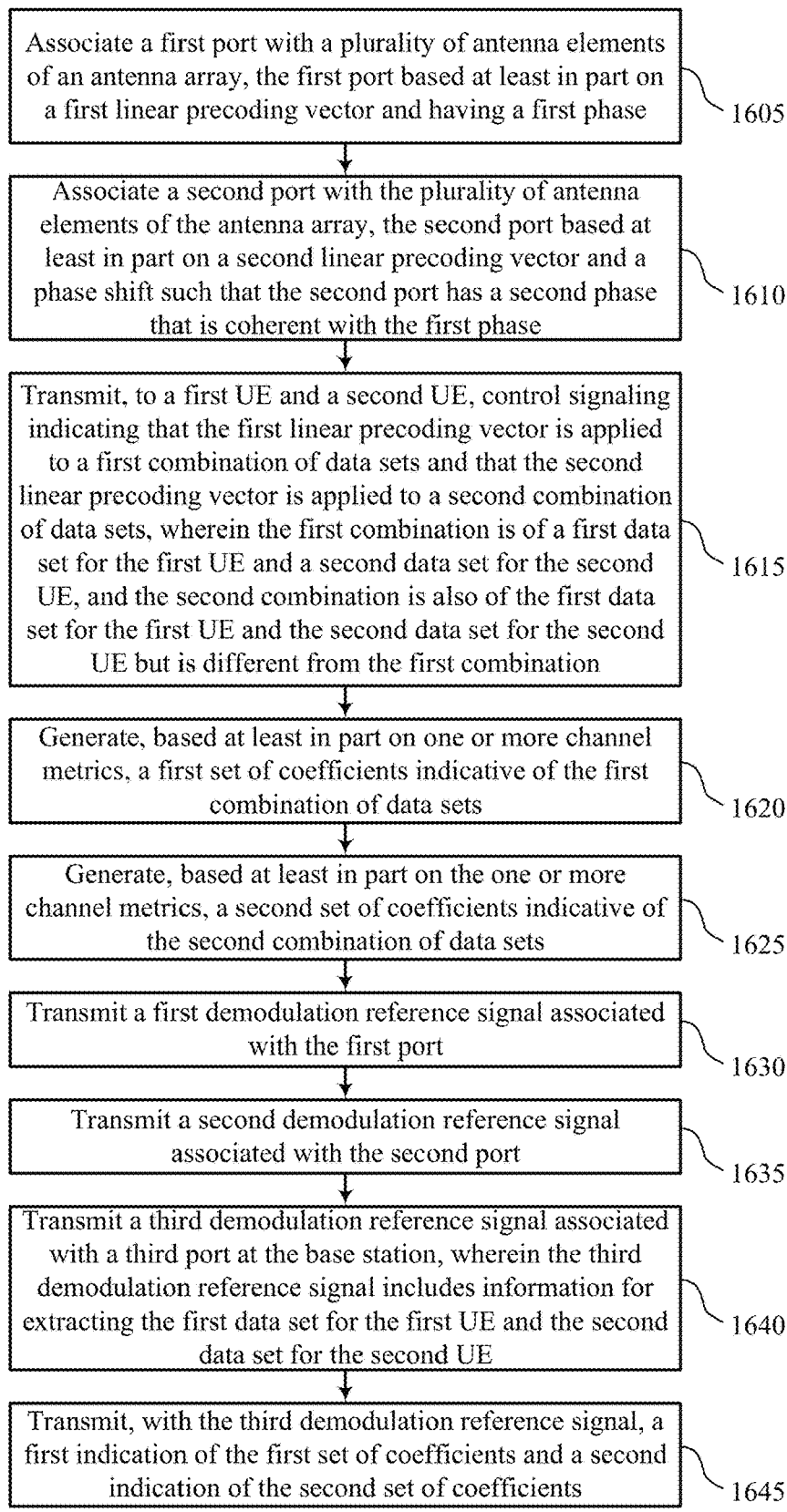

FIG. 16 shows a flowchart illustrating a method 1600 that supports channel estimation and demodulation procedure for non-linear MU-MIMO precoding in accordance with aspects of the present disclosure. The operations of the method 1600 may be implemented by a base station or its components as described herein. For example, the operations of the method 1600 may be performed by a base station 105 as described with reference to FIGS. 1 through 10. In some examples, a base station may execute a set of instructions to control the functional elements of the base station to perform the described functions. Additionally or alternatively, the base station may perform aspects of the described functions using special-purpose hardware.

At 1605, the method may include associating a first port with a set of multiple antenna elements of an antenna array, the first port based on a first linear precoding vector and having a first phase. The operations of 1605 may be performed in accordance with examples as disclosed herein. In some examples, aspects of the operations of 1605 may be performed by a first port component 925 as described with reference to FIG. 9.

At 1610, the method may include associating a second port with the set of multiple antenna elements of the antenna array, the second port based on a second linear precoding vector and a phase shift such that the second port has a second phase that is coherent with the first phase. The operations of 1610 may be performed in accordance with examples as disclosed herein. In some examples, aspects of the operations of 1610 may be performed by a second port component 930 as described with reference to FIG. 9.

At 1615, the method may include transmitting, to a first UE and a second UE, control signaling indicating that the first linear precoding vector is applied to a first combination of data sets and that the second linear precoding vector is applied to a second combination of data sets, where the first combination is of a first data set for the first UE and a second data set for the second UE, and the second combination is also of the first data set for the first UE and the second data set for the second UE but is different from the first combination. The operations of 1615 may be performed in accordance with examples as disclosed herein. In some examples, aspects of the operations of 1615 may be performed by a precoding indicator component 935 as described with reference to FIG. 9.

At 1620, the method may include generating, based on one or more channel metrics, a first set of coefficients indicative of the first combination of data sets. The operations of 1620 may be performed in accordance with examples as disclosed herein. In some examples, aspects of the operations of 1620 may be performed by a data set coefficient generator 955 as described with reference to FIG. 9.

At 1625, the method may include generating, based on the one or more channel metrics, a second set of coefficients indicative of the second combination of data sets. The operations of 1625 may be performed in accordance with examples as disclosed herein. In some examples, aspects of the operations of 1625 may be performed by a data set coefficient generator 955 as described with reference to FIG. 9.

At 1630, the method may include transmitting a first demodulation reference signal associated with the first port. The operations of 1630 may be performed in accordance with examples as disclosed herein. In some examples, aspects of the operations of 1630 may be performed by a first port component 925 as described with reference to FIG. 9.

At 1635, the method may include transmitting a second demodulation reference signal associated with the second port. The operations of 1635 may be performed in accordance with examples as disclosed herein. In some examples, aspects of the operations of 1635 may be performed by a second port component 930 as described with reference to FIG. 9.

At 1640, the method may include transmitting a third demodulation reference signal associated with a third port at the base station, where the third demodulation reference signal includes information for extracting the first data set for the first UE and the second data set for the second UE. The operations of 1640 may be performed in accordance with examples as disclosed herein. In some examples, aspects of the operations of 1640 may be performed by a third port component 940 as described with reference to FIG. 9.

At 1645, the method may include transmitting, with the third demodulation reference signal, a first indication of the first set of coefficients and a second indication of the second set of coefficients. The operations of 1645 may be performed in accordance with examples as disclosed herein. In some examples, aspects of the operations of 1645 may be performed by a third port component 940 as described with reference to FIG. 9.

Figure 17:
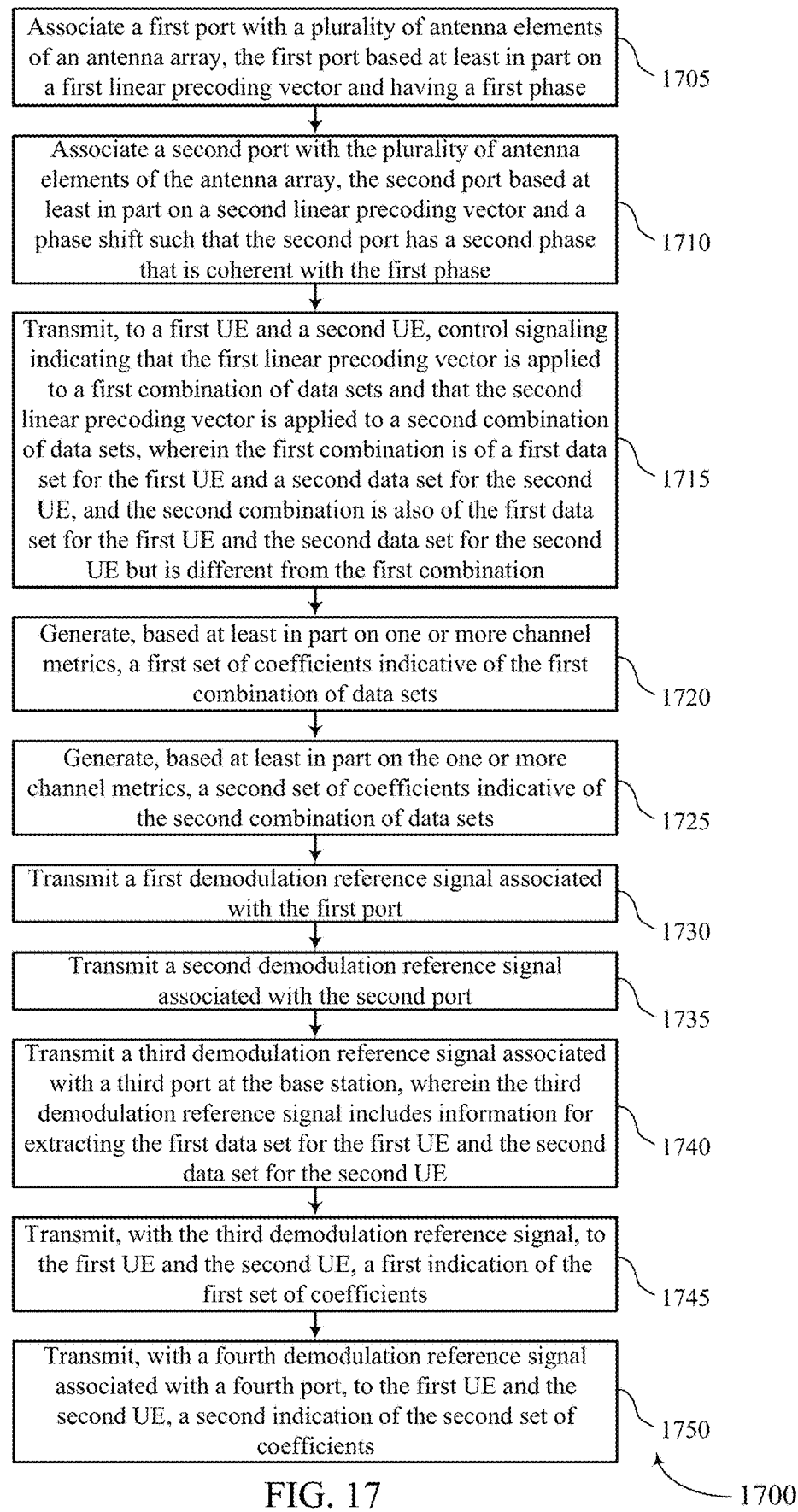

FIG. 17 shows a flowchart illustrating a method 1700 that supports channel estimation and demodulation procedure for non-linear MU-MIMO precoding in accordance with aspects of the present disclosure. The operations of the method 1700 may be implemented by a base station or its components as described herein. For example, the operations of the method 1700 may be performed by a base station 105 as described with reference to FIGS. 1 through 10. In some examples, a base station may execute a set of instructions to control the functional elements of the base station to perform the described functions. Additionally or alternatively, the base station may perform aspects of the described functions using special-purpose hardware.

At 1705, the method may include associating a first port with a set of multiple antenna elements of an antenna array, the first port based on a first linear precoding vector and having a first phase. The operations of 1705 may be performed in accordance with examples as disclosed herein. In some examples, aspects of the operations of 1705 may be performed by a first port component 925 as described with reference to FIG. 9.

At 1710, the method may include associating a second port with the set of multiple antenna elements of the antenna array, the second port based on a second linear precoding vector and a phase shift such that the second port has a second phase that is coherent with the first phase. The operations of 1710 may be performed in accordance with examples as disclosed herein. In some examples, aspects of the operations of 1710 may be performed by a second port component 930 as described with reference to FIG. 9.

At 1715, the method may include transmitting, to a first UE and a second UE, control signaling indicating that the first linear precoding vector is applied to a first combination of data sets and that the second linear precoding vector is applied to a second combination of data sets, where the first combination is of a first data set for the first UE and a second data set for the second UE, and the second combination is also of the first data set for the first UE and the second data set for the second UE but is different from the first combination. The operations of 1715 may be performed in accordance with examples as disclosed herein. In some examples, aspects of the operations of 1715 may be performed by a precoding indicator component 935 as described with reference to FIG. 9.

At 1720, the method may include generating, based on one or more channel metrics, a first set of coefficients indicative of the first combination of data sets. The operations of 1720 may be performed in accordance with examples as disclosed herein. In some examples, aspects of the operations of 1720 may be performed by a data set coefficient generator 955 as described with reference to FIG. 9.

At 1725, the method may include generating, based on the one or more channel metrics, a second set of coefficients indicative of the second combination of data sets. The operations of 1725 may be performed in accordance with examples as disclosed herein. In some examples, aspects of the operations of 1725 may be performed by a data set coefficient generator 955 as described with reference to FIG. 9.

At 1730, the method may include transmitting a first demodulation reference signal associated with the first port. The operations of 1730 may be performed in accordance with examples as disclosed herein. In some examples, aspects of the operations of 1730 may be performed by a first port component 925 as described with reference to FIG. 9.

At 1735, the method may include transmitting a second demodulation reference signal associated with the second port. The operations of 1735 may be performed in accordance with examples as disclosed herein. In some examples, aspects of the operations of 1735 may be performed by a second port component 930 as described with reference to FIG. 9.

At 1740, the method may include transmitting a third demodulation reference signal associated with a third port at the base station, where the third demodulation reference signal includes information for extracting the first data set for the first UE and the second data set for the second UE. The operations of 1740 may be performed in accordance with examples as disclosed herein. In some examples, aspects of the operations of 1740 may be performed by a third port component 940 as described with reference to FIG. 9.

At 1745, the method may include transmitting, with the third demodulation reference signal, to the first UE and the second UE, a first indication of the first set of coefficients. The operations of 1745 may be performed in accordance with examples as disclosed herein. In some examples, aspects of the operations of 1745 may be performed by a third port component 940 as described with reference to FIG. 9.

At 1750, the method may include transmitting, with a fourth demodulation reference signal associated with a fourth port, to the first UE and the second UE, a second indication of the second set of coefficients. The operations of 1750 may be performed in accordance with examples as disclosed herein. In some examples, aspects of the operations of 1750 may be performed by a fourth port component 960 as described with reference to FIG. 9.

Figure 18:
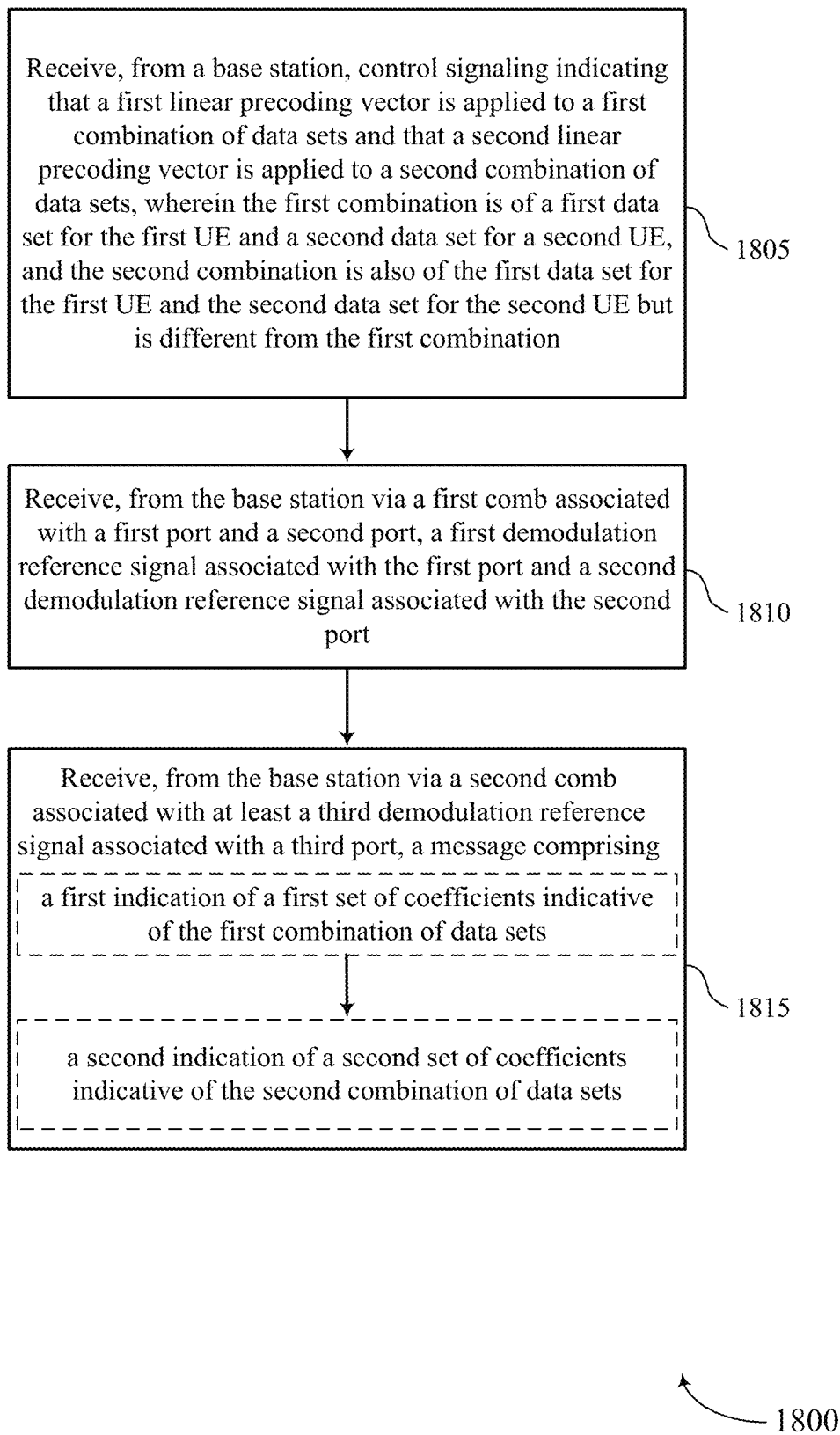

FIG. 18 shows a flowchart illustrating a method 1800 that supports channel estimation and demodulation procedure for non-linear MU-MIMO precoding in accordance with aspects of the present disclosure. The operations of the method 1800 may be implemented by a UE or its components as described herein. For example, the operations of the method 1800 may be performed by a UE 115 as described with reference to FIGS. 1 through 6 and 11 through 14. In some examples, a UE may execute a set of instructions to control the functional elements of the UE to perform the described functions. Additionally or alternatively, the UE may perform aspects of the described functions using special-purpose hardware.

At 1805, the method may include receiving, from a base station, control signaling indicating that a first linear precoding vector is applied to a first combination of data sets and that a second linear precoding vector is applied to a second combination of data sets, where the first combination is of a first data set for the first UE and a second data set for a second UE, and the second combination is also of the first data set for the first UE and the second data set for the second UE but is different from the first combination. The operations of 1805 may be performed in accordance with examples as disclosed herein. In some examples, aspects of the operations of 1805 may be performed by a precoding indicator component 1325 as described with reference to FIG. 13.

At 1810, the method may include receiving, from the base station via a first comb associated with a first port and a second port, a first demodulation reference signal associated with the first port and a second demodulation reference signal associated with the second port. The operations of 1810 may be performed in accordance with examples as disclosed herein. In some examples, aspects of the operations of 1810 may be performed by a first comb component 1330 as described with reference to FIG. 13.

At 1815, the method may include receiving, from the base station via a second comb associated with at least a third demodulation reference signal associated with a third port, a message including a first indication of a first set of coefficients indicative of the first combination of data sets and a second indication of a second set of coefficients indicative of the second combination of data sets. The operations of 1815 may be performed in accordance with examples as disclosed herein. In some examples, aspects of the operations of 1815 may be performed by a second comb component 1335 as described with reference to FIG. 13.

Figure 19:
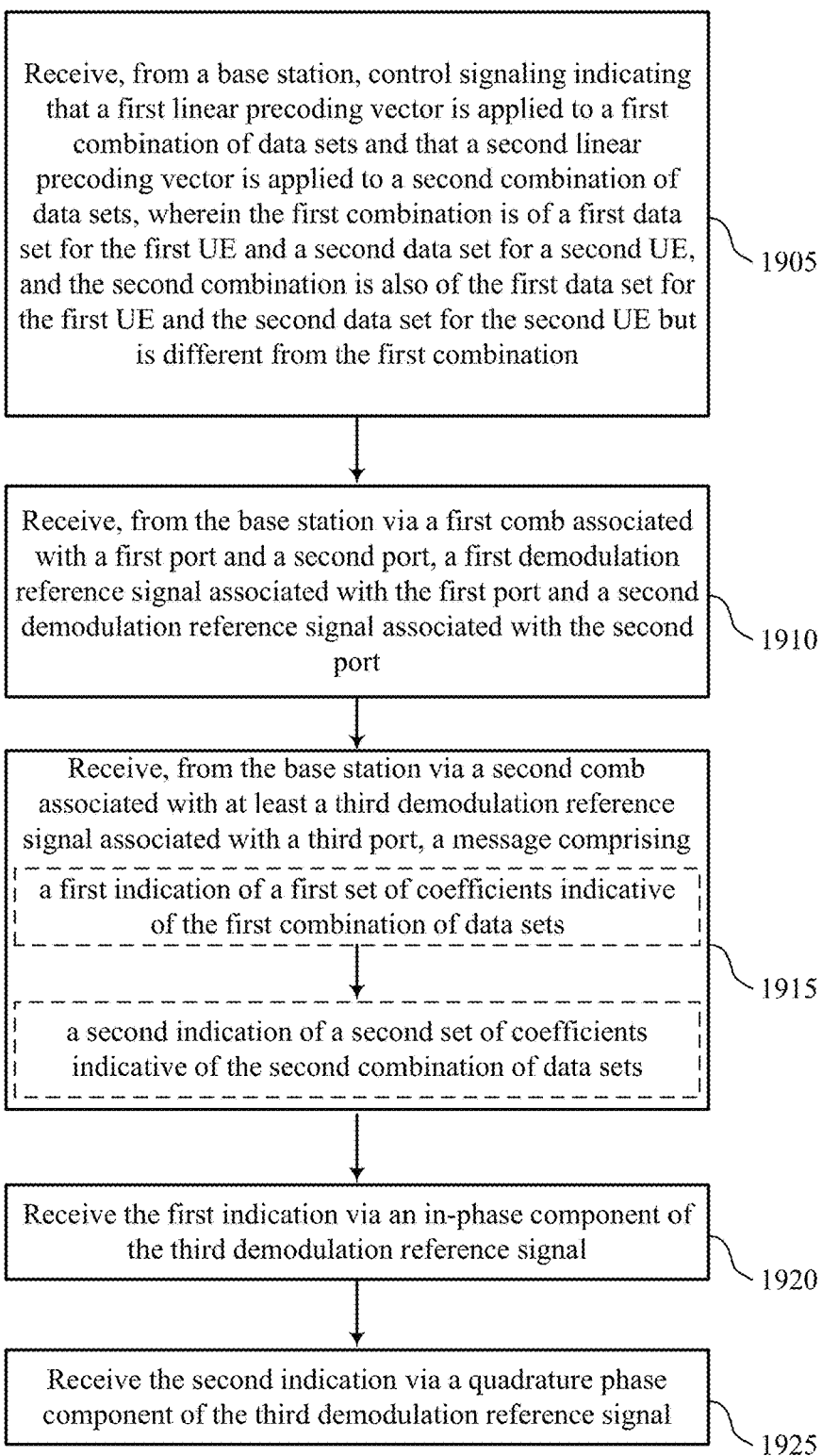

FIG. 19 shows a flowchart illustrating a method 1900 that supports channel estimation and demodulation procedure for non-linear MU-MIMO precoding in accordance with aspects of the present disclosure. The operations of the method 1900 may be implemented by a UE or its components as described herein. For example, the operations of the method 1900 may be performed by a UE 115 as described with reference to FIGS. 1 through 6 and 11 through 14. In some examples, a UE may execute a set of instructions to control the functional elements of the UE to perform the described functions. Additionally or alternatively, the UE may perform aspects of the described functions using special-purpose hardware.

At 1905, the method may include receiving, from a base station, control signaling indicating that a first linear precoding vector is applied to a first combination of data sets and that a second linear precoding vector is applied to a second combination of data sets, where the first combination is of a first data set for the first UE and a second data set for a second UE, and the second combination is also of the first data set for the first UE and the second data set for the second UE but is different from the first combination. The operations of 1905 may be performed in accordance with examples as disclosed herein. In some examples, aspects of the operations of 1905 may be performed by a precoding indicator component 1325 as described with reference to FIG. 13.

At 1910, the method may include receiving, from the base station via a first comb associated with a first port and a second port, a first demodulation reference signal associated with the first port and a second demodulation reference signal associated with the second port. The operations of 1910 may be performed in accordance with examples as disclosed herein. In some examples, aspects of the operations of 1910 may be performed by a first comb component 1330 as described with reference to FIG. 13.

At 1915, the method may include receiving, from the base station via a second comb associated with at least a third demodulation reference signal associated with a third port, a message including a first indication of a first set of coefficients indicative of the first combination of data sets and a second indication of a second set of coefficients indicative of the second combination of data sets. The operations of 1915 may be performed in accordance with examples as disclosed herein. In some examples, aspects of the operations of 1915 may be performed by a second comb component 1335 as described with reference to FIG. 13.

At 1920, the method may include receiving the first indication via an in-phase component of the third demodulation reference signal. The operations of 1920 may be performed in accordance with examples as disclosed herein. In some examples, aspects of the operations of 1920 may be performed by a third port component 1350 as described with reference to FIG. 13.

At 1925, the method may include receiving the second indication via a quadrature phase component of the third demodulation reference signal. The operations of 1925 may be performed in accordance with examples as disclosed herein. In some examples, aspects of the operations of 1925 may be performed by a third port component 1350 as described with reference to FIG. 13.

Figure 20:
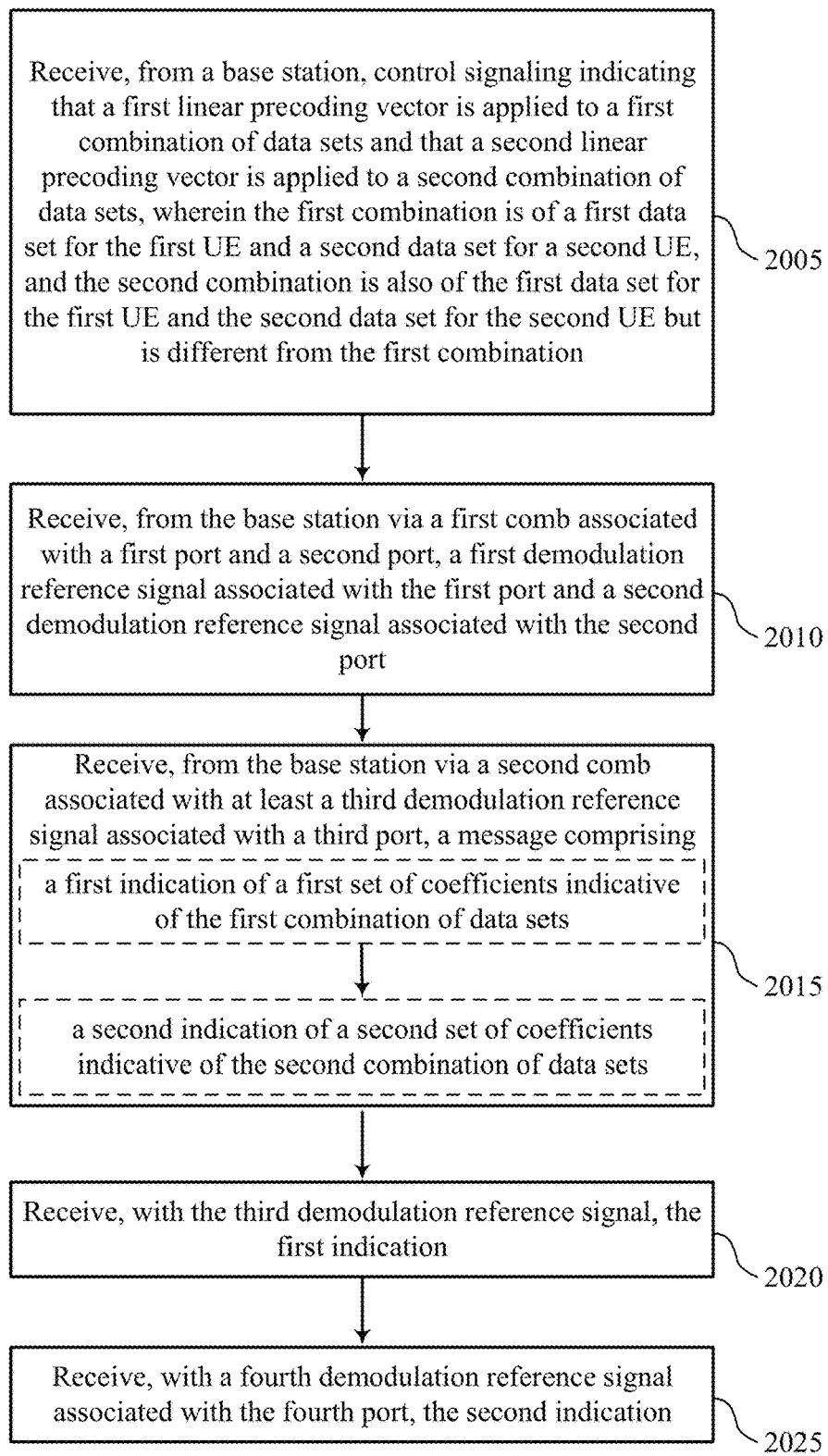

FIG. 20 shows a flowchart illustrating a method 2000 that supports channel estimation and demodulation procedure for non-linear MU-MIMO precoding in accordance with aspects of the present disclosure. The operations of the method 2000 may be implemented by a UE or its components as described herein. For example, the operations of the method 2000 may be performed by a UE 115 as described with reference to FIGS. 1 through 6 and 11 through 14. In some examples, a UE may execute a set of instructions to control the functional elements of the UE to perform the described functions. Additionally or alternatively, the UE may perform aspects of the described functions using special-purpose hardware.

At 2005, the method may include receiving, from a base station, control signaling indicating that a first linear precoding vector is applied to a first combination of data sets and that a second linear precoding vector is applied to a second combination of data sets, where the first combination is of a first data set for the first UE and a second data set for a second UE, and the second combination is also of the first data set for the first UE and the second data set for the second UE but is different from the first combination. The operations of 2005 may be performed in accordance with examples as disclosed herein. In some examples, aspects of the operations of 2005 may be performed by a precoding indicator component 1325 as described with reference to FIG. 13.

At 2010, the method may include receiving, from the base station via a first comb associated with a first port and a second port, a first demodulation reference signal associated with the first port and a second demodulation reference signal associated with the second port. The operations of 2010 may be performed in accordance with examples as disclosed herein. In some examples, aspects of the operations of 2010 may be performed by a first comb component 1330 as described with reference to FIG. 13.

At 2015, the method may include receiving, from the base station via a second comb associated with at least a third demodulation reference signal associated with a third port, a message including a first indication of a first set of coefficients indicative of the first combination of data sets and a second indication of a second set of coefficients indicative of the second combination of data sets. The operations of 2015 may be performed in accordance with examples as disclosed herein. In some examples, aspects of the operations of 2015 may be performed by a second comb component 1335 as described with reference to FIG. 13.

At 2020, the method may include receiving, with the third demodulation reference signal, the first indication. The operations of 2020 may be performed in accordance with examples as disclosed herein. In some examples, aspects of the operations of 2020 may be performed by a third port component 1350 as described with reference to FIG. 13.

At 2025, the method may include receiving, with a fourth demodulation reference signal associated a fourth port, the second indication. The operations of 2025 may be performed in accordance with examples as disclosed herein.

In some examples, aspects of the operations of 2025 may be performed by a fourth port component 1355 as described with reference to FIG. 13.

The following provides an overview of aspects of the present disclosure:

Aspect 1: A method of wireless communications at a base station, comprising: associating a first port with a plurality of antenna elements of an antenna array, the first port based at least in part on a first linear precoding vector and having a first phase; associating a second port with the plurality of antenna elements of the antenna array, the second port based at least in part on a second linear precoding vector and a phase shift such that the second port has a second phase that is coherent with the first phase; transmitting, to a first UE and a second UE, control signaling indicating that the first linear precoding vector is applied to a first combination of data sets and that the second linear precoding vector is applied to a second combination of data sets, wherein the first combination is of a first data set for the first UE and a second data set for the second UE, and the second combination is also of the first data set for the first UE and the second data set for the second UE but is different from the first combination; transmitting a first demodulation reference signal associated with the first port; transmitting a second demodulation reference signal associated with the second port; and transmitting a third demodulation reference signal associated with a third port at the base station, wherein the third demodulation reference signal includes information for extracting the first data set for the first UE and the second data set for the second UE.

Aspect 2: The method of aspect 1, further comprising: transmitting, with the control signaling, an indication that the first UE is associated with the first data set and that the second UE is associated with the second data set.

Aspect 3: The method of any of aspects 1 through 2, further comprising: transmitting the control signaling via a downlink control information signal.

Aspect 4: The method of any of aspects 1 through 3, further comprising: generating, based at least in part on one or more channel metrics, a first set of coefficients indicative of the first combination of data sets; and generating, based at least in part on the one or more channel metrics, a second set of coefficients indicative of the second combination of data sets.

Aspect 5: The method of aspect 4, further comprising: transmitting, with the third demodulation reference signal, a first indication of the first set of coefficients and a second indication of the second set of coefficients.

Aspect 6: The method of aspect 5, wherein transmitting the first indication and the second indication comprises: transmitting the first indication via an in-phase component of the third demodulation reference signal; and transmitting the second indication via a quadrature component of the third demodulation reference signal.

Aspect 7: The method of any of aspects 5 through 6, further comprising: transmitting, with the control signaling, a third indication to use at least one of the first demodulation reference signal, the second demodulation reference signal, or the third demodulation reference signal for estimating the first set of coefficients and the second set of coefficients.

Aspect 8: The method of any of aspects 4 through 7, further comprising: transmitting, with the third demodulation reference signal, to the first UE and the second UE, a first indication of the first set of coefficients; and transmitting, with a fourth demodulation reference signal associated with a fourth port, to the first UE and the second UE, a second indication of the second set of coefficients.

Aspect 9: The method of aspect 8, further comprising: transmitting, with the control signaling, a third indication to use at least one of the first demodulation reference signal, the second demodulation reference signal, the third demodulation reference signal, or the fourth demodulation reference signal for estimating the first set of coefficients and the second set of coefficients.

Aspect 10: The method of any of aspects 4 through 9, further comprising: transmitting, with the control signaling, an indication of a frequency granularity for estimating the first set of coefficients and the second set of coefficients.

Aspect 11: A method of wireless communications at a first UE, comprising: receiving, from a base station, control signaling indicating that a first linear precoding vector is applied to a first combination of data sets and that a second linear precoding vector is applied to a second combination of data sets, wherein the first combination is of a first data set for the first UE and a second data set for a second UE, and the second combination is also of the first data set for the first UE and the second data set for the second UE but is different from the first combination; receiving, from the base station via a first comb associated with a first port and a second port, a first demodulation reference signal associated with the first port and a second demodulation reference signal associated with the second port; and receiving, from the base station via a second comb associated with at least a third demodulation reference signal associated with a third port, a message comprising: a first indication of a first set of coefficients indicative of the first combination of data sets; and a second indication of a second set of coefficients indicative of the second combination of data sets.

Aspect 12: The method of aspect 11, further comprising: receiving the control signaling via a downlink control information message.

Aspect 13: The method of any of aspects 11 through 12, further comprising: receiving, with the control signaling, a third indication that the first UE is associated with the first data set and the second UE is associated with the second data set.

Aspect 14: The method of any of aspects 11 through 13, wherein receiving the message comprises: receiving the first indication via an in-phase component of the third demodulation reference signal; and receiving the second indication via a quadrature phase component of the third demodulation reference signal.

Aspect 15: The method of aspect 14, further comprising: receiving, with the control signaling, a third indication to use at least one of the first demodulation reference signal, the second demodulation reference signal, or the third demodulation reference signal for estimating the first set of coefficients and the second set of coefficients; and estimating the first set of coefficients and the second set of coefficients based at least in part on the control signaling.

Aspect 16: The method of any of aspects 11 through 15, wherein the second comb is associated with a fourth port, wherein receiving the message comprises: receiving, with the third demodulation reference signal, the first indication; and receiving, with a fourth demodulation reference signal associated a the fourth port, the second indication.

Aspect 17: The method of aspect 16, further comprising: receiving, with the control signaling, a third indication to use at least one of the first demodulation reference signal, the second demodulation reference signal, the third demodulation reference signal, or the fourth demodulation reference signal for estimating the first set of coefficients and the second set of coefficients; and estimating the first set of coefficients and the second set of coefficients based at least in part on the control signaling.

Aspect 18: The method of any of aspects 11 through 17, further comprising: receiving, with the control signaling, a third indication of a frequency granularity for estimating the first set of coefficients and the second set of coefficients; and estimating the first set of coefficients and the second set of coefficients based at least in part on the third indication of the frequency granularity, the first indication, and the second indication.

Aspect 19: An apparatus comprising a processor; memory coupled with the processor; and instructions stored in the memory and executable by the processor to cause the apparatus to perform a method of any of aspects 1 through 10.

Aspect 20: An apparatus comprising at least one means for performing a method of any of aspects 1 through 10.

Aspect 21: A non-transitory computer-readable medium storing code the code comprising instructions executable by a processor to perform a method of any of aspects 1 through 10.

Aspect 22: An apparatus comprising a processor; memory coupled with the processor; and instructions stored in the memory and executable by the processor to cause the apparatus to perform a method of any of aspects 11 through 18.

Aspect 23: An apparatus comprising at least one means for performing a method of any of aspects 11 through 18.

Aspect 24: A non-transitory computer-readable medium storing code the code comprising instructions executable by a processor to perform a method of any of aspects 11 through 18

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a base station, comprising:
    a processor;
    memory coupled with the processor; and
    instructions stored in the memory and executable by the processor to cause the apparatus to:
        associate a first port with a plurality of antenna elements of an antenna array, the first port based at least in part on a first linear precoding vector and having a first phase;
        associate a second port with the plurality of antenna elements of the antenna array, the second port based at least in part on a second linear precoding vector and a phase shift such that the second port has a second phase that is coherent with the first phase;
        transmit, to a first user equipment (UE) and a second UE, control signaling indicating that the first linear precoding vector is applied to a first combination of data sets and that the second linear precoding vector is applied to a second combination of data sets, wherein the first combination is of a first data set for the first UE and a second data set for the second UE, and the second combination is also of the first data set for the first UE and the second data set for the second UE but is different from the first combination;
        transmit a first demodulation reference signal associated with the first port;
        transmit a second demodulation reference signal associated with the second port; and
        transmit a third demodulation reference signal associated with a third port at the base station, wherein the third demodulation reference signal includes information for extracting the first data set for the first UE and the second data set for the second UE.

2. The apparatus of claim 1, wherein the instructions are further executable by the processor to cause the apparatus to:
    transmit, with the control signaling, an indication that the first UE is associated with the first data set and that the second UE is associated with the second data set.

3. The apparatus of claim 1, wherein the instructions are further executable by the processor to cause the apparatus to:
    transmit the control signaling via a downlink control information signal.

4. The apparatus of claim 1, wherein the instructions are further executable by the processor to cause the apparatus to:
    generate, based at least in part on one or more channel metrics, a first set of coefficients indicative of the first combination of data sets; and
    generate, based at least in part on the one or more channel metrics, a second set of coefficients indicative of the second combination of data sets.

5. The apparatus of claim 4, wherein the instructions are further executable by the processor to cause the apparatus to:
    transmit, with the third demodulation reference signal, a first indication of the first set of coefficients and a second indication of the second set of coefficients.

6. The apparatus of claim 5, wherein the instructions to transmit the first indication and the second indication are executable by the processor to cause the apparatus to:
    transmit the first indication via an in-phase component of the third demodulation reference signal; and
    transmit the second indication via a quadrature component of the third demodulation reference signal.

7. The apparatus of claim 5, wherein the instructions are further executable by the processor to cause the apparatus to:
    transmit, with the control signaling, a third indication to use at least one of the first demodulation reference signal, the second demodulation reference signal, or the third demodulation reference signal for estimating the first set of coefficients and the second set of coefficients.

8. The apparatus of claim 4, wherein the instructions are further executable by the processor to cause the apparatus to:
    transmit, with the third demodulation reference signal, to the first UE and the second UE, a first indication of the first set of coefficients; and
    transmit, with a fourth demodulation reference signal associated with a fourth port, to the first UE and the second UE, a second indication of the second set of coefficients.

9. The apparatus of claim 8, wherein the instructions are further executable by the processor to cause the apparatus to:
    transmit, with the control signaling, a third indication to use at least one of the first demodulation reference signal, the second demodulation reference signal, the third demodulation reference signal, or the fourth demodulation reference signal for estimating the first set of coefficients and the second set of coefficients.

10. The apparatus of claim 4, wherein the instructions are further executable by the processor to cause the apparatus to:
    transmit, with the control signaling, an indication of a frequency granularity for estimating the first set of coefficients and the second set of coefficients.

11. An apparatus for wireless communications at a first user equipment (UE), comprising:

a processor;
memory coupled with the processor; and
instructions stored in the memory and executable by the processor to cause the apparatus to:
receive, from a base station, control signaling indicating that a first linear precoding vector is applied to a first combination of data sets and that a second linear precoding vector is applied to a second combination of data sets, wherein the first combination is of a first data set for the first UE and a second data set for a second UE, and the second combination is also of the first data set for the first UE and the second data set for the second UE but is different from the first combination;
receive, from the base station via a first comb associated with a first port and a second port, a first demodulation reference signal associated with the first port and a second demodulation reference signal associated with the second port; and
receive, from the base station via a second comb associated with at least a third demodulation reference signal associated with a third port, a message comprising:
a first indication of a first set of coefficients indicative of the first combination of data sets; and
a second indication of a second set of coefficients indicative of the second combination of data sets.

12. The apparatus of claim 11, wherein the instructions are further executable by the processor to cause the apparatus to:
receive the control signaling via a downlink control information message.

13. The apparatus of claim 11, wherein the instructions are further executable by the processor to cause the apparatus to:
receive, with the control signaling, a third indication that the first UE is associated with the first data set and the second UE is associated with the second data set.

14. The apparatus of claim 11, wherein the instructions to receive the message are executable by the processor to cause the apparatus to:
receive the first indication via an in-phase component of the third demodulation reference signal; and
receive the second indication via a quadrature phase component of the third demodulation reference signal.

15. The apparatus of claim 14, wherein the instructions are further executable by the processor to cause the apparatus to:
receive, with the control signaling, a third indication to use at least one of the first demodulation reference signal, the second demodulation reference signal, or the third demodulation reference signal for estimating the first set of coefficients and the second set of coefficients; and
estimate the first set of coefficients and the second set of coefficients based at least in part on the control signaling.

16. The apparatus of claim 11, wherein the instructions to receive the message are executable by the processor to cause the apparatus to:
receive, with the third demodulation reference signal, the first indication; and
receive, with a fourth demodulation reference signal associated with a fourth port, the second indication.

17. The apparatus of claim 16, wherein the instructions are further executable by the processor to cause the apparatus to:
receive, with the control signaling, a third indication to use at least one of the first demodulation reference signal, the second demodulation reference signal, the third demodulation reference signal, or the fourth demodulation reference signal for estimating the first set of coefficients and the second set of coefficients; and
estimate the first set of coefficients and the second set of coefficients based at least in part on the control signaling.

18. The apparatus of claim 11, wherein the instructions are further executable by the processor to cause the apparatus to:
receive, with the control signaling, a third indication of a frequency granularity for estimating the first set of coefficients and the second set of coefficients; and
estimate the first set of coefficients and the second set of coefficients based at least in part on the third indication of the frequency granularity, the first indication, and the second indication.

19. A method of wireless communications at a base station, comprising:
associating a first port with a plurality of antenna elements of an antenna array, the first port based at least in part on a first linear precoding vector and having a first phase;
associating a second port with the plurality of antenna elements of the antenna array, the second port based at least in part on a second linear precoding vector and a phase shift such that the second port has a second phase that is coherent with the first phase;
transmitting, to a first user equipment (UE) and a second UE, control signaling indicating that the first linear precoding vector is applied to a first combination of data sets and that the second linear precoding vector is applied to a second combination of data sets, wherein the first combination is of a first data set for the first UE and a second data set for the second UE, and the second combination is also of the first data set for the first UE and the second data set for the second UE but is different from the first combination;
transmitting a first demodulation reference signal associated with the first port;
transmitting a second demodulation reference signal associated with the second port; and
transmitting a third demodulation reference signal associated with a third port at the base station, wherein the third demodulation reference signal includes information for extracting the first data set for the first UE and the second data set for the second UE.

20. The method of claim 19, further comprising:
transmitting, with the control signaling, an indication that the first UE is associated with the first data set and that the second UE is associated with the second data set.

21. The method of claim 19, further comprising:
transmitting the control signaling via a downlink control information signal.

22. The method of claim 19, further comprising:
generating, based at least in part on one or more channel metrics, a first set of coefficients indicative of the first combination of data sets; and
generating, based at least in part on the one or more channel metrics, a second set of coefficients indicative of the second combination of data sets.

23. The method of claim 22, further comprising:
transmitting, with the third demodulation reference signal, a first indication of the first set of coefficients and a second indication of the second set of coefficients.

24. The method of claim 23, wherein transmitting the first indication and the second indication comprises:

transmitting the first indication via an in-phase component of the third demodulation reference signal; and
transmitting the second indication via a quadrature component of the third demodulation reference signal.

25. The method of claim 23, further comprising:
transmitting, with the control signaling, a third indication to use at least one of the first demodulation reference signal, the second demodulation reference signal, or the third demodulation reference signal for estimating the first set of coefficients and the second set of coefficients.

26. The method of claim 22, further comprising:
transmitting, with the third demodulation reference signal, to the first UE and the second UE, a first indication of the first set of coefficients; and
transmitting, with a fourth demodulation reference signal associated with a fourth port, to the first UE and the second UE, a second indication of the second set of coefficients.

27. The method of claim 26, further comprising:
transmitting, with the control signaling, a third indication to use at least one of the first demodulation reference signal, the second demodulation reference signal, the third demodulation reference signal, or the fourth demodulation reference signal for estimating the first set of coefficients and the second set of coefficients.

28. The method of claim 22, further comprising:
transmitting, with the control signaling, an indication of a frequency granularity for estimating the first set of coefficients and the second set of coefficients.

29. A method of wireless communications at a first user equipment (UE), comprising:
receiving, from a base station, control signaling indicating that a first linear precoding vector is applied to a first combination of data sets and that a second linear precoding vector is applied to a second combination of data sets, wherein the first combination is of a first data set for the first UE and a second data set for a second UE, and the second combination is also of the first data set for the first UE and the second data set for the second UE but is different from the first combination;
receiving, from the base station via a first comb associated with a first port and a second port, a first demodulation reference signal associated with the first port and a second demodulation reference signal associated with the second port; and
receiving, from the base station via a second comb associated with at least a third demodulation reference signal associated with a third port, a message comprising:
a first indication of a first set of coefficients indicative of the first combination of data sets; and
a second indication of a second set of coefficients indicative of the second combination of data sets.

30. The method of claim 29, further comprising:
receiving the control signaling via a downlink control information message.

* * * * *